(12) United States Patent
Johnson et al.

(10) Patent No.: US 9,988,047 B2
(45) Date of Patent: Jun. 5, 2018

(54) VEHICLE CONTROL SYSTEM WITH TRAFFIC DRIVING CONTROL

(71) Applicant: MAGNA ELECTRONICS INC., Auburn Hills, MI (US)

(72) Inventors: Nathaniel S. Johnson, Royal Oak, MI (US); Christopher L. Van Dan Elzen, Rochester, MI (US); Christoph Klas, Aachen (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 151 days.

(21) Appl. No.: 14/568,177

(22) Filed: Dec. 12, 2014

(65) Prior Publication Data
US 2015/0166062 A1 Jun. 18, 2015

Related U.S. Application Data

(60) Provisional application No. 61/953,970, filed on Mar. 17, 2014, provisional application No. 61/919,133, filed on Dec. 20, 2013, provisional application No. 61/915,218, filed on Dec. 12, 2013.

(51) Int. Cl.
| | |
|---|---|
| *B60W 30/12* | (2006.01) |
| *B60W 10/20* | (2006.01) |
| *B60W 10/06* | (2006.01) |
| *B60W 10/184* | (2012.01) |

(Continued)

(52) U.S. Cl.
CPC ............ *B60W 30/12* (2013.01); *B60W 10/06* (2013.01); *B60W 10/184* (2013.01); *B60W 10/20* (2013.01); *B60W 30/16* (2013.01); *G08G 1/165* (2013.01); *G08G 1/166* (2013.01); *G08G 1/167* (2013.01); *B60W 2420/42* (2013.01); *B60W 2520/10* (2013.01); *B60W 2550/10* (2013.01); *B60W 2550/302* (2013.01); *B60W 2550/304* (2013.01); *B60W 2550/306* (2013.01); *B60W 2550/308* (2013.01); *B60W 2720/10* (2013.01)

(58) Field of Classification Search
None
See application file for complete search history.

(56) References Cited

U.S. PATENT DOCUMENTS

| | | |
|---|---|---|
| 4,720,790 A | 1/1988 | Miki et al. |
| 4,987,357 A | 1/1991 | Masaki |
| 4,991,054 A | 2/1991 | Walters |

(Continued)

*Primary Examiner* — Adam D Tissot
(74) *Attorney, Agent, or Firm* — Honigman Miller Schwartz and Cohn, LLP

(57) ABSTRACT

A control system for a vehicle includes a camera disposed at a vehicle and having a field of view exterior of the vehicle. An image processor is operable to process image data captured by the camera to at least detect objects or other vehicles. The control system, responsive to determination of a traffic condition, is operable to control a steering system of the vehicle. Responsive at least in part to image processing of captured image data, the control system is operable to detect a lane splitting vehicle approaching or adjacent to the vehicle. With the vehicle traveling in an occupied traffic lane and responsive to detection of the lane splitting vehicle approaching the vehicle, the control system controls the steering system of the vehicle to move the vehicle in a direction away from a side region of the occupied lane at which the lane splitting vehicle is detected.

20 Claims, 12 Drawing Sheets

(51) Int. Cl.
  *B60W 30/16* (2012.01)
  *G08G 1/16* (2006.01)

(56) References Cited

U.S. PATENT DOCUMENTS

| | | |
|---|---|---|
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,255,442 A | 10/1993 | Schierbeek et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,579 A * | 5/1996 | Bernhard ......... B60K 31/0008 180/167 |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |

(56) References Cited

U.S. PATENT DOCUMENTS

| | | | |
|---|---|---|---|
| 6,084,519 A | 7/2000 | Coulling et al. | |
| 6,097,024 A | 8/2000 | Stam et al. | |
| 6,100,799 A | 8/2000 | Fenk | |
| 6,144,022 A | 11/2000 | Tenenbaum et al. | |
| 6,175,300 B1 | 1/2001 | Kendrick | |
| 6,178,034 B1 | 1/2001 | Allemand et al. | |
| 6,201,642 B1 | 3/2001 | Bos et al. | |
| 6,223,114 B1 | 4/2001 | Boros et al. | |
| 6,227,689 B1 | 5/2001 | Miller | |
| 6,250,148 B1 | 6/2001 | Lynam | |
| 6,266,082 B1 | 7/2001 | Yonezawa et al. | |
| 6,266,442 B1 | 7/2001 | Laumeyer et al. | |
| 6,285,393 B1 | 9/2001 | Shimoura et al. | |
| 6,294,989 B1 | 9/2001 | Schofield et al. | |
| 6,297,781 B1 | 10/2001 | Turnbull et al. | |
| 6,310,611 B1 | 10/2001 | Caldwell | |
| 6,313,454 B1 | 11/2001 | Bos et al. | |
| 6,317,057 B1 | 11/2001 | Lee | |
| 6,320,282 B1 | 11/2001 | Caldwell | |
| 6,333,759 B1 | 12/2001 | Mazzilli | |
| 6,341,523 B2 | 1/2002 | Lynam | |
| 6,353,392 B1 | 3/2002 | Schofield et al. | |
| 6,370,329 B1 | 4/2002 | Teuchert | |
| 6,392,315 B1 | 5/2002 | Jones et al. | |
| 6,396,397 B1 | 5/2002 | Bos et al. | |
| 6,411,204 B1 | 6/2002 | Bloomfield et al. | |
| 6,420,975 B1 | 7/2002 | Deline et al. | |
| 6,424,273 B1 | 7/2002 | Gutta et al. | |
| 6,430,303 B1 | 8/2002 | Naoi et al. | |
| 6,442,465 B2 | 8/2002 | Breed et al. | |
| 6,477,464 B2 | 11/2002 | McCarthy et al. | |
| 6,497,503 B1 | 12/2002 | Dassanayake et al. | |
| 6,498,620 B2 | 12/2002 | Schofield et al. | |
| 6,516,664 B2 | 2/2003 | Lynam | |
| 6,534,884 B2 | 3/2003 | Marcus et al. | |
| 6,539,306 B2 | 3/2003 | Turnbull | |
| 6,547,133 B1 | 4/2003 | Devries, Jr. et al. | |
| 6,553,130 B1 | 4/2003 | Lemelson et al. | |
| 6,560,527 B1 * | 5/2003 | Russell | F01L 1/34 123/350 |
| 6,574,033 B1 | 6/2003 | Chui et al. | |
| 6,589,625 B1 | 7/2003 | Kothari et al. | |
| 6,594,583 B2 | 7/2003 | Ogura et al. | |
| 6,611,610 B1 | 8/2003 | Stam et al. | |
| 6,636,258 B2 | 10/2003 | Strumolo | |
| 6,650,455 B2 | 11/2003 | Miles | |
| 6,672,731 B2 | 1/2004 | Schnell et al. | |
| 6,674,562 B1 | 1/2004 | Miles | |
| 6,678,614 B2 | 1/2004 | McCarthy et al. | |
| 6,680,792 B2 | 1/2004 | Miles | |
| 6,690,268 B2 | 2/2004 | Schofield et al. | |
| 6,700,605 B1 | 3/2004 | Toyoda et al. | |
| 6,704,621 B1 | 3/2004 | Stein et al. | |
| 6,710,908 B2 | 3/2004 | Miles et al. | |
| 6,711,474 B1 | 3/2004 | Treyz et al. | |
| 6,714,331 B2 | 3/2004 | Lewis et al. | |
| 6,717,610 B1 | 4/2004 | Bos et al. | |
| 6,735,506 B2 | 5/2004 | Breed et al. | |
| 6,741,377 B2 | 5/2004 | Miles | |
| 6,744,353 B2 | 6/2004 | Sjonell | |
| 6,757,109 B2 | 6/2004 | Bos | |
| 6,762,867 B2 | 7/2004 | Lippert et al. | |
| 6,794,119 B2 | 9/2004 | Miles | |
| 6,795,221 B1 | 9/2004 | Urey | |
| 6,806,452 B2 | 10/2004 | Bos et al. | |
| 6,819,231 B2 | 11/2004 | Berberich et al. | |
| 6,823,241 B2 | 11/2004 | Shirato et al. | |
| 6,824,281 B2 | 11/2004 | Schofield et al. | |
| 6,850,156 B2 | 2/2005 | Bloomfield et al. | |
| 6,882,287 B2 | 4/2005 | Schofield | |
| 6,889,161 B2 | 5/2005 | Winner et al. | |
| 6,890,041 B1 * | 5/2005 | Ribbens | B60T 8/17616 303/112 |
| 6,909,753 B2 | 6/2005 | Meehan et al. | |
| 6,946,978 B2 | 9/2005 | Schofield | |
| 6,968,736 B2 | 11/2005 | Lynam | |
| 6,975,775 B2 | 12/2005 | Rykowski et al. | |
| 6,989,736 B2 | 1/2006 | Berberich et al. | |
| 7,004,606 B2 | 2/2006 | Schofield | |
| 7,005,974 B2 | 2/2006 | McMahon et al. | |
| 7,038,577 B2 | 5/2006 | Pawlicki et al. | |
| 7,062,300 B1 | 6/2006 | Kim | |
| 7,065,432 B2 | 6/2006 | Moisel et al. | |
| 7,079,017 B2 | 7/2006 | Lang et al. | |
| 7,085,637 B2 | 8/2006 | Breed et al. | |
| 7,092,548 B2 | 8/2006 | Laumeyer et al. | |
| 7,111,968 B2 | 9/2006 | Bauer et al. | |
| 7,116,246 B2 | 10/2006 | Winter et al. | |
| 7,123,168 B2 | 10/2006 | Schofield | |
| 7,136,753 B2 | 11/2006 | Samukawa et al. | |
| 7,145,519 B2 | 12/2006 | Takahashi et al. | |
| 7,149,613 B2 | 12/2006 | Stam et al. | |
| 7,161,616 B1 | 1/2007 | Okamoto et al. | |
| 7,195,381 B2 | 3/2007 | Lynam et al. | |
| 7,202,776 B2 | 4/2007 | Breed | |
| 7,227,611 B2 | 6/2007 | Hull et al. | |
| 7,338,177 B2 | 3/2008 | Lynam | |
| 7,365,769 B1 | 4/2008 | Mager | |
| 7,370,983 B2 | 5/2008 | De Wind et al. | |
| 7,444,241 B2 * | 10/2008 | Grimm | B60T 7/22 340/901 |
| 7,460,951 B2 | 12/2008 | Altan | |
| 7,480,149 B2 | 1/2009 | Deward et al. | |
| 7,490,007 B2 | 2/2009 | Taylor et al. | |
| 7,492,281 B2 | 2/2009 | Lynam et al. | |
| 7,526,103 B2 | 4/2009 | Schofield et al. | |
| 7,581,859 B2 | 9/2009 | Lynam | |
| 7,592,928 B2 | 9/2009 | Chinomi et al. | |
| 7,639,149 B2 | 12/2009 | Katoh | |
| 7,681,960 B2 | 3/2010 | Wanke et al. | |
| 7,720,580 B2 | 5/2010 | Higgins-Luthman | |
| 7,724,962 B2 | 5/2010 | Zhu et al. | |
| 7,777,611 B2 | 8/2010 | Desai | |
| 7,855,755 B2 | 12/2010 | Weller et al. | |
| 7,881,496 B2 | 2/2011 | Camilleri et al. | |
| 7,914,187 B2 | 3/2011 | Higgins-Luthman et al. | |
| 7,952,490 B2 | 5/2011 | Fechner et al. | |
| 7,965,336 B2 | 6/2011 | Bingle et al. | |
| 8,013,780 B2 | 9/2011 | Lynam et al. | |
| 8,027,029 B2 | 9/2011 | Lu et al. | |
| 8,058,977 B2 | 11/2011 | Lynam | |
| 8,340,866 B2 | 12/2012 | Hanzawa et al. | |
| 8,473,144 B1 * | 6/2013 | Dolgov | B60W 30/095 348/119 |
| 8,849,495 B2 | 9/2014 | Chundrlik, Jr. et al. | |
| 9,019,090 B2 | 4/2015 | Weller et al. | |
| 9,041,806 B2 | 5/2015 | Baur et al. | |
| 9,090,234 B2 | 7/2015 | Johnson et al. | |
| 9,092,986 B2 | 7/2015 | Salomonsson et al. | |
| 2002/0015153 A1 | 2/2002 | Downs | |
| 2002/0044065 A1 | 4/2002 | Quist et al. | |
| 2002/0113873 A1 | 8/2002 | Williams | |
| 2002/0118862 A1 | 8/2002 | Sugimoto et al. | |
| 2003/0137586 A1 | 7/2003 | Lewellen | |
| 2003/0222982 A1 | 12/2003 | Hamdan et al. | |
| 2004/0114381 A1 | 6/2004 | Salmeen et al. | |
| 2005/0078389 A1 | 4/2005 | Kulas et al. | |
| 2005/0134983 A1 | 6/2005 | Lynam | |
| 2005/0264891 A1 | 12/2005 | Uken et al. | |
| 2006/0018511 A1 | 1/2006 | Stam et al. | |
| 2006/0018512 A1 | 1/2006 | Stam et al. | |
| 2006/0061008 A1 | 3/2006 | Karner et al. | |
| 2006/0091813 A1 | 5/2006 | Stam et al. | |
| 2006/0103727 A1 | 5/2006 | Tseng | |
| 2006/0164221 A1 | 7/2006 | Jensen | |
| 2006/0250501 A1 | 11/2006 | Wildmann et al. | |
| 2006/0255920 A1 | 11/2006 | Maeda et al. | |
| 2006/0290479 A1 | 12/2006 | Akatsuka et al. | |
| 2007/0104476 A1 | 5/2007 | Yasutomi et al. | |
| 2008/0162027 A1 * | 7/2008 | Murphy | B60W 50/14 701/117 |
| 2009/0093938 A1 | 4/2009 | Isaji et al. | |
| 2009/0113509 A1 | 4/2009 | Tseng et al. | |
| 2009/0171559 A1 | 7/2009 | Lehtiniemi et al. | |

(56) References Cited

U.S. PATENT DOCUMENTS

| | | |
|---|---|---|
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0265069 A1 | 10/2009 | Desbrunes |
| 2009/0295181 A1 | 12/2009 | Lawlor et al. |
| 2010/0020170 A1 | 1/2010 | Higgins-Luthman et al. |
| 2010/0097469 A1 | 4/2010 | Blank et al. |
| 2010/0228437 A1 | 9/2010 | Hanzawa et al. |
| 2011/0115615 A1 | 5/2011 | Luo et al. |
| 2011/0157309 A1 | 6/2011 | Bennett et al. |
| 2011/0224978 A1 | 9/2011 | Sawada |
| 2012/0044066 A1 | 2/2012 | Mauderer et al. |
| 2012/0062743 A1* | 3/2012 | Lynam ............... B60Q 9/005 348/148 |
| 2012/0218412 A1 | 8/2012 | Dellantoni et al. |
| 2012/0245817 A1 | 9/2012 | Cooprider et al. |
| 2012/0262340 A1 | 10/2012 | Hassan et al. |
| 2012/0303222 A1 | 11/2012 | Cooprider et al. |
| 2013/0116859 A1 | 5/2013 | Ihlenburg et al. |
| 2013/0124052 A1 | 5/2013 | Hahne |
| 2013/0129150 A1 | 5/2013 | Saito |
| 2013/0131918 A1 | 5/2013 | Hahne |
| 2013/0141578 A1 | 6/2013 | Chundrlik, Jr. et al. |
| 2013/0222593 A1 | 8/2013 | Byrne et al. |
| 2013/0278769 A1 | 10/2013 | Nix et al. |
| 2013/0314503 A1 | 11/2013 | Nix et al. |
| 2014/0018995 A1* | 1/2014 | Ferguson ............ G06K 9/00798 701/25 |
| 2014/0067206 A1 | 3/2014 | Pflug |
| 2014/0152778 A1 | 6/2014 | Ihlenburg |
| 2014/0156157 A1 | 6/2014 | Johnson et al. |
| 2014/0218529 A1 | 8/2014 | Mahmoud |
| 2014/0218535 A1 | 8/2014 | Ihlenburg |
| 2014/0222280 A1 | 8/2014 | Salomonsson |
| 2014/0313339 A1 | 10/2014 | Diessner et al. |
| 2014/0340510 A1 | 11/2014 | Ihlenburg |
| 2014/0379233 A1 | 12/2014 | Chundrlik, Jr. et al. |

* cited by examiner

VEHICLE CONTROL SYSTEM WITH TRAFFIC DRIVING CONTROL

CROSS REFERENCE TO RELATED APPLICATIONS

The present application is related to U.S. provisional applications, Ser. No. 61/953,970, filed Mar. 17, 2014, Ser. No. 61/919,133, filed Dec. 20, 2013, and Ser. No. 61/915,218, filed Dec. 12, 2013, which are hereby incorporated herein by reference in their entireties.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle (such as forwardly and rearwardly of the vehicle), and provides the communication/data signals, including camera data or image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle.

According to an aspect of the present invention, a vision system for a vehicle includes one or more cameras or image sensors disposed at a vehicle and having respective fields of view exterior of the vehicle, and an image processor operable to process data transmitted by the cameras. The vision system includes a forward facing camera module (having image processing circuitry incorporated therein) and also include a rearward facing vision camera (for capturing video image data that is displayed on a display of the vehicle for viewing by the driver of the vehicle during a reversing maneuver) and/or sideward facing cameras. The vision system may provide a variety of functions by utilizing captured image data from one or more of the cameras at the vehicle, such as a forward viewing camera, a rearward viewing camera, side viewing cameras and/or a forward viewing windshield mounted camera (having a field of view through the windshield of the vehicle). The vision system may have a front windshield camera module that may have image data processing capabilities for that camera and for one or more other cameras of the vehicle, or multiple cameras (such as a forward viewing camera at a forward portion of the vehicle, a rearward viewing camera, side viewing cameras, a forward viewing camera that views through a windshield of the vehicle, and optionally a night vision camera) may feed into a common image data processing module. The vision system of the present invention may be operable to determine (such as via image processing of captured image data and via a speed of the vehicle) when the vehicle is traveling in traffic, such as high volume traffic, a traffic jam situation or the like, and a controller or control system may control or autonomously drive the vehicle during such traffic conditions.

Optionally, when controlling the vehicle in a traffic driving condition, the system may determine when a lane splitting vehicle (such as a motorcycle or motor scooter or bicycle or other small vehicle) is driving between lanes of traffic (commonly referred to as lane splitting) and may control the subject vehicle accordingly. For example, when the system detects a vehicle or motorcycle approaching (such as from behind the vehicle or ahead of the vehicle) at the left side, the system may move the subject vehicle towards the right side of the subject vehicle's lane or occupied lane and away from the lane splitting motorcycle, while still remaining in the occupied lane. After the detected motorcycle passes, the system may move the subject vehicle back towards the center of the occupied lane. Also, responsive to detection of a lane splitting motorcycle or the like, the system can limit or prevent lane change if such a lane change would result in collision with the lane splitting motorcycle.

Optionally, when controlling the vehicle in a traffic driving condition, the system may determine when more lanes of traffic begin, such as when two lanes of traffic change to three or four lanes as the vehicles move closer together to create additional lanes to enhance traffic flow. Responsive to such a determination, the system may automatically select a leading vehicle or "lane of traffic" to follow and follow that vehicle even if that results in the subject vehicle leaving the road lane that it had been occupying.

Optionally, the system may be operable to detect pedestrians and may slow or stop to allow for pedestrians to cross the road in front of the vehicle as may occur in high volume traffic situations and/or fast or slow moving traffic situations, such as in a crowded city street or the like. For example, the control system, at least in part responsive to detection of a stationary pedestrian in the path of travel of the equipped vehicle, may be operable to stop the equipped vehicle. Also, for example, the control system, at least in part responsive to detection of a moving pedestrian in the path of travel of the equipped vehicle, may be operable to slowly move the equipped vehicle forward at a speed that allows the pedestrian time to move out of the path of travel of the equipped vehicle.

The system thus is operable to determine the driving condition or traffic condition of the subject vehicle and, when that determined condition is indicative of traffic, such as high volume traffic or slow moving traffic or a traffic jam, the system may control the subject vehicle to drive the subject vehicle in the traffic. The system detects the surrounding vehicles and determines the appropriate driving direction and speed for the subject vehicle to move the subject vehicle with the traffic flow and to adapt the driving of the subject vehicle to the surrounding vehicles and traffic flow. The system is operable to detect pedestrians and may slow or stop to allow for pedestrians to cross the road in front of the vehicle as may occur in high volume traffic situations and/or fast or slow moving traffic situations, such as in a crowded city street or the like. Also, the system may drive the vehicle forward slowly and carefully if all pedestrians in front of the vehicle are moving, such as in a manner that would result in the pedestrians being out of the path of travel of the vehicle when the vehicle is at the current location of the detected pedestrians, or such as in a manner that allows the pedestrians time to move out of the path of travel of the vehicle (allowing the pedestrian time to change their path by the time the vehicle arrives at their initial location).

These and other objects, advantages, purposes and features of the present invention will become apparent upon review of the following specification in conjunction with the drawings.

BRIEF DESCRIPTION OF THE DRAWINGS

FIGS. 13 and 14 are schematics of how the vision system of the present invention controls the equipped vehicle when another vehicle wants to pull out in front of or behind the equipped vehicle, such as when the equipped vehicle is blocking or partially blocking a driveway or the like;

DESCRIPTION OF THE PREFERRED EMBODIMENTS

A vehicle vision system and/or driver assist system and/or object detection system and/or alert system and/or control system and/or autonomous vehicle control system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes a processor that is operable to receive image data from the vehicle cameras and may provide a displayed image that is representative of the subject vehicle (such as for a top down or bird's eye or surround view, such as discussed below). The vision and display system may utilize aspects of the systems described in U.S. Pat. Nos. 7,855,755; 7,720,580 and/or 7,038,577, and/or U.S. patent application Ser. No. 13/894,870, filed May 15, 2013, and/or Ser. No. 12/405,558, filed Mar. 17, 2009, which are hereby incorporated herein by reference in their entireties. The vision system may have a front windshield camera module that may have image data processing capabilities for that camera and for one or more other cameras of the vehicle, or multiple cameras (such as a forward viewing camera at a forward portion of the vehicle, a rearward viewing camera, side viewing cameras, a forward viewing camera that views through a windshield of the vehicle, and optionally a night vision camera) may feed into a common image data processing module, such as by utilizing aspects of the vision systems described in U.S. patent application Ser. No. 13/894,870, filed May 15, 2013, which is hereby incorporated herein by reference in its entirety.

Figure 1:
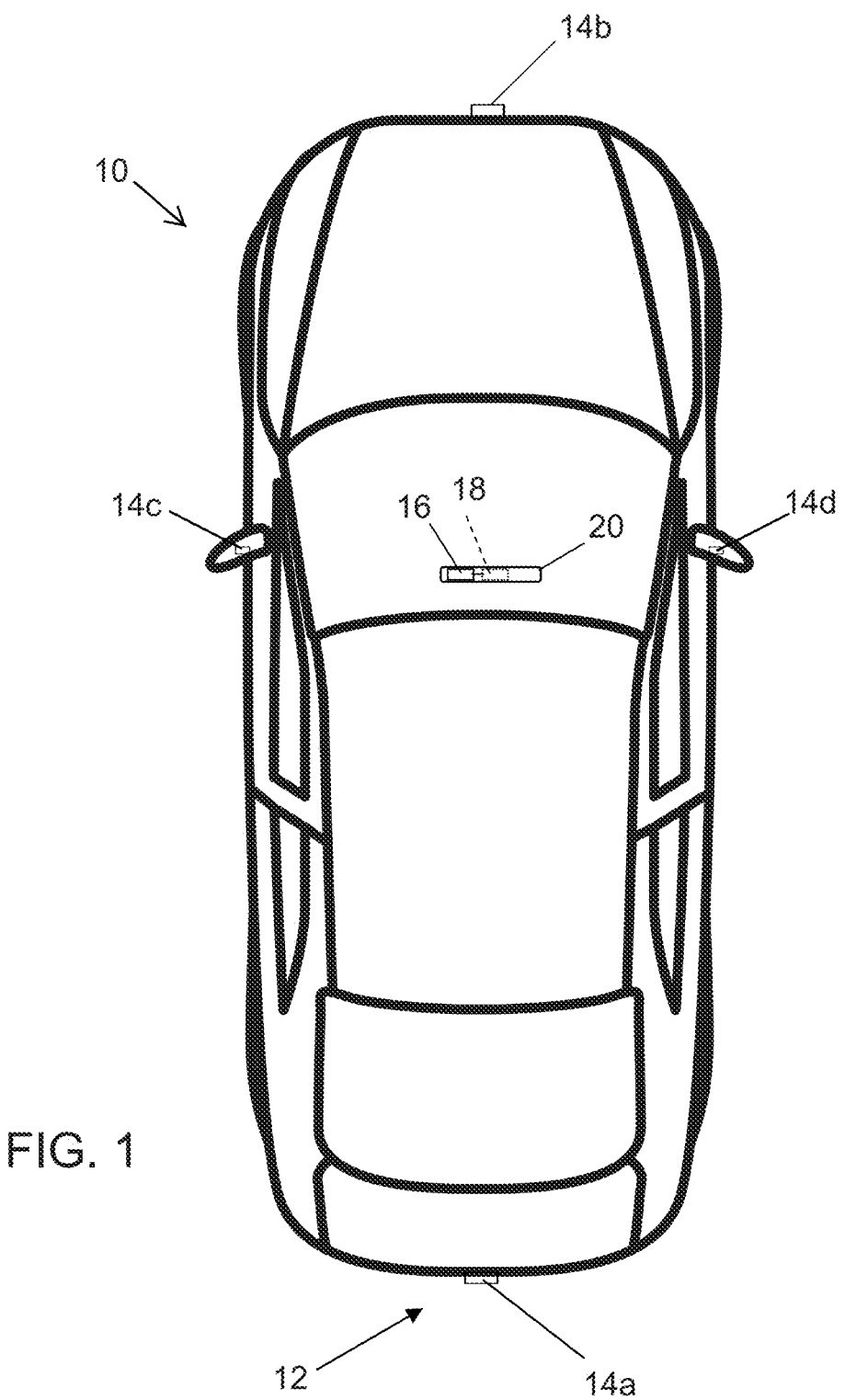
FIG. 1 is a plan view of a vehicle with a vision system and imaging sensors or cameras that provide exterior fields of view and may provide information to the driver via a display in accordance with the present invention.

Referring now to the drawings and the illustrative embodiments depicted therein, a vehicle 10 includes an imaging system or vision system 12 that includes at least one exterior facing imaging sensor or camera (such as a wide angle camera or multiple sensors on a single camera or the like), such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14b at respective sides of the vehicle), which captures images exterior of the vehicle, with the camera having a lens for focusing images at or onto an imaging array or imaging plane or imager of the camera (FIG. 1). The vision system 12 includes a control or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle).

The vision system may also operate in conjunction with other sensors of the vehicle, such as RADAR sensors or LIDAR sensors or Time-of-Flight (TOF) sensors or Ultrasonic sensors or the like. The system thus may be operable to provide enhanced detection of objects or other vehicles at or near the subject or equipped vehicle and may determine the distance to the objects or other vehicles and the speed and directional heading of the detected objects or other vehicles relative to the equipped vehicle.

The system of the present invention is operable to provide a driver assist or traffic jam assist function (providing lateral and longitudinal control in pedestrian and/or traffic scenarios (low speed, controlled access road)). Optionally, the vision system of the present invention may provide various features, such as, for example, a full autonomous driving function including autonomous lane change to overtake slower cars, construction area driving and lane merges, an autonomous pull-over maneuver function in case of an incapacitated and/or unresponsive driver, an automatic trailer hookup function (which is operable to guide the vehicle to a trailer), an automatic cruise control (ACC) automatic go in a stop and go ACC (such as for city driving conditions/environments), an enhanced automatic emergency braking (AEB) function based on rear traffic (optionally, for example, overriding or not braking or delaying braking if rear traffic is present), a blind spot detection function (to limit or prevent accidents during lane change maneuvers), an onramp assist function (to predict whether the equipped vehicle can accelerate enough to merge with existing traffic before the end of the onramp), a low speed CMB/pedestrian function (with a wider field of view to detect pedestrians that are relevant for impact while driving at very low speeds (such as around 1-2 m/s or thereabouts or more or less), a prevent running red lights function (such as by generating an alert and/or optionally braking the vehicle), an alert to go when a traffic light changes to green, a better lane detection function in low sun or low lighting conditions (with improved availability of lane information such as, for example, for LKA, LDW and the like), a trailer backup function (which is operable to automatically steer the vehicle based on a driver selected trajectory), an automatic parking (parallel, perpendicular) function with drive in control of longitudinal movement, an autonomous/remote controlled parking (parallel, perpendicular) function, a traffic sign recognition (TSR) extension to height limitation signs, a parking path height detection function, an AEB function during a reversing or backup maneuver, a traffic sign recognition (TSR) to set ACC speed (so as to provide a speed limiter function or the like), a ball detection function, a pedestrian impact detection function to activate a pedpro system (such as to use a camera to replace an existing sensor or in addition to another impact sensor), a road friction estimation function (such as for determining if the vehicle is traveling on snow, gravel, ice or the like) to adjust the AEB thresholds and/or curve speed warning, a pothole depth and speed bump height estimation function for an active suspension control, a read license plate of preceding/following vehicle function (such as, for example, for Amber Alert notifications and the like), a curb detection/warning if a curb is too high to drive onto (such as if the vehicle is being driven towards a curb, so as to limit or prevent damage to the wheels or rims of the vehicle), an application of 3D information to parking situations function, a perspective correction function for a more accurate birds eye view (more realistic image), an ACC function that limits or precludes acceleration of the subject vehicle when the subject vehicle is being overtaken by another vehicle, and/or a lighting control function (such as providing an adjust lighting decision based on knowledge or other car overtaking of driving parallel to the subject vehicle), and/or the like.

The present invention provides a vehicle vision system that is operable to provide semi-automated driving and/or hands free driving to assist the driver in maneuvering the vehicle in traffic conditions so the driver of the equipped vehicle can relax and not have to operate the vehicle during the typical starting/stopping/weaving driving conditions of a traffic situation. The system of the present invention provides autonomous or semi-autonomous vehicle control in a traffic environment (such as high volume traffic conditions or traffic jam conditions or the like), and may take control of the vehicle responsive to detection of a high or threshold level traffic environment, such as responsive to image processing of captured image data (such as when the image processing determines that the equipped vehicle is generally or at least partially surrounded by other vehicles in a manner indicative of a traffic condition) and the speed of the equipped vehicle. For example, the system may only provide such control of the vehicle when the vehicle is traveling at lower speeds, such as below about 25 kph or below about 50 kph or below about 70 kph or thereabouts.

The present provides semi-autonomous driving capability utilizing the image data captured from multiple vehicle cameras, such as five exterior viewing cameras (such as, for example, a front mounted forward viewing camera, a rear mounted rearward viewing camera, side mounted sideward/rearward viewing cameras and a windshield mounted forward viewing camera or camera module). The system is operable to track lane markings and to position the vehicle at the road based on information from the four cameras at the exterior of the vehicle, such as when the windshield camera can no longer see the lane markings due to dense traffic, for example. As the leading vehicles ahead of the equipped vehicle come in close, it may not be possible to see twenty meters of lane markings from the windshield camera or front mounted camera, but it may be possible to see the lane markings alongside or behind our vehicle using the other cameras. This can be used to position the vehicle for autonomous driving.

When the lane markings are not determinable, such as in a city environment, it may be possible to use other information, such as adjacent vehicles or road constructions (such as curbs or the like) to delineate the path of travel of the equipped vehicle. In cases where lane splitting or lane sharing is allowed, the vehicle surround view cameras may be used to identify approaching motorcycles or bicycles that may be traveling between lanes of traffic. When such approaching small vehicles are detected, the vehicle may adjust its path of travel within its occupied lane to create space for the approaching motorcycle/bicycle.

The system of the present invention is thus operable to detect traffic behaviors, and may control the equipped vehicle to maneuver the vehicle with the traffic flow in a manner that provides safe travel and that controls the vehicle so that the vehicle is driven in a similar manner as the other vehicles on the road, in order to enhance traffic flow. The system may use any suitable processing means or protocol to determine the traffic conditions and to detect vehicles and/or pedestrians on or off the road being traveled by the equipped vehicle and on or off cross roads and merging roads at or near the traveled road. The system may learn or adapt the driving or control of the vehicle (such as during the driving or control of the vehicle or before taking control of the vehicle) responsive to the driving or maneuvering of other vehicles on the road. The system may adapt the driving or control of the vehicle responsive to a geographical location of the equipped vehicle to provide regional localization control, in order to adapt the autonomous control or driving to the driving characteristics of that location or region (for example, drivers drive differently in California, Paris and Italy, where it is acceptable for motorcycles and the like to drive along lane markers and between lanes of traffic).

Responsive to detected vehicles and objects and pedestrians in a determined traffic situation, the system of the present invention may control the vehicle to react to a determined hazardous condition or danger. For example, the system may move the vehicle to one side or the other, or may prevent a lane change by the driver of the vehicle, or may prevent a door opening by an occupant of the vehicle or the like, depending on determined objects or vehicles at or near or approaching the equipped vehicle. The system may interact with the determined other vehicles and may provide control of the vehicle motion or steering/accelerator/brakes of the equipped vehicle, and may control a turn signal of the vehicle to interact with other vehicles and drivers and systems on the road.

Figure 2:
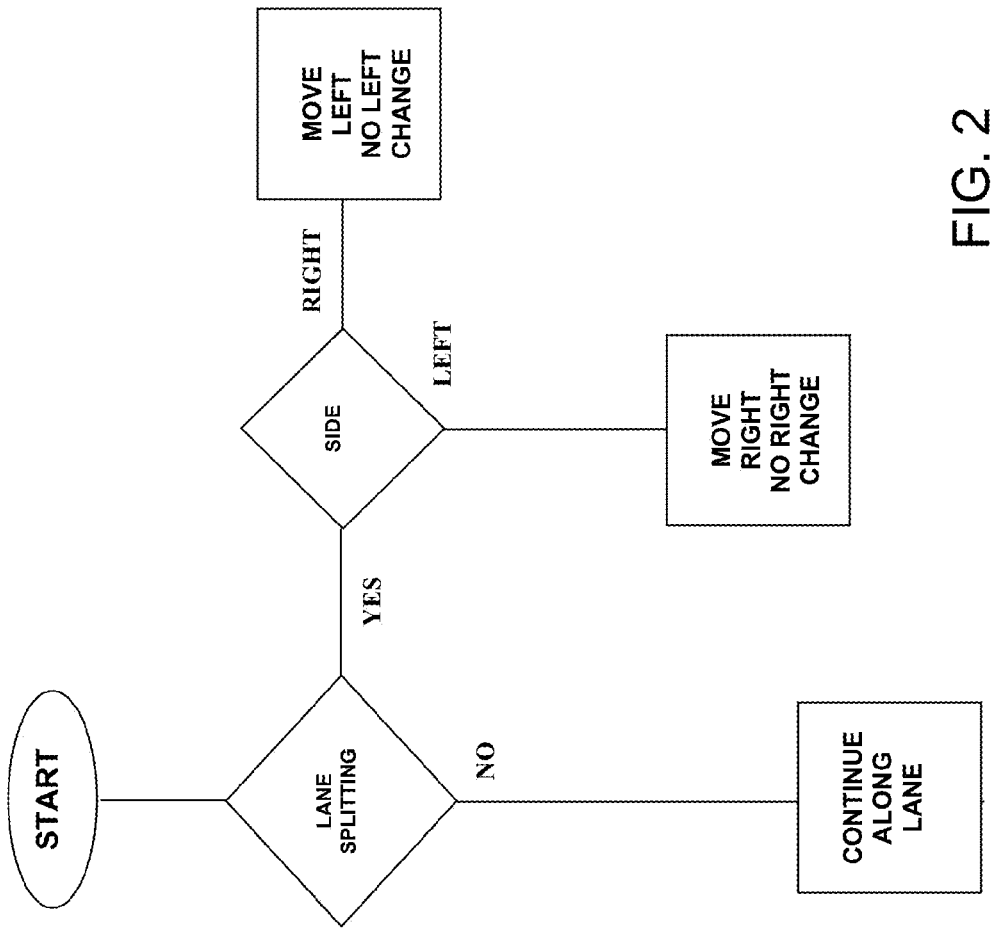
FIG. 2 is a flow chart of the vision system control of an equipped vehicle in accordance with the present invention, showing vehicle control in a lane splitting situation.
Figure 3:
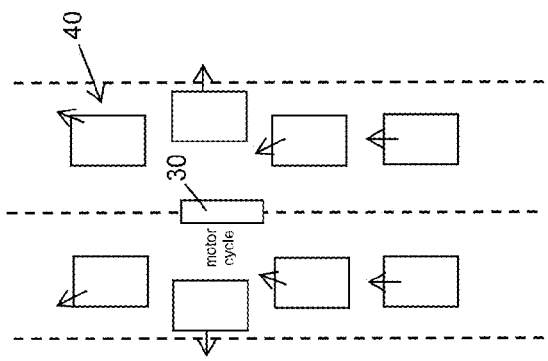
FIG. 3 is a schematic of how the vision system controls equipped vehicles in accordance with the present invention, showing vehicle control in a lane splitting situation.

For example, and with reference to FIGS. 2 and 3, the vision system or control system of the present invention is operable, at least when in a traffic situation, to detect a lane splitting vehicle, such as a motorcycle cutting through slow moving traffic and between vehicles traveling along two adjacent lanes, and to control the equipped vehicle accordingly. The system may utilize a side camera and/or a rear camera and/or a blind spot radar sensor or the like to detect the presence or approach of a lane splitting vehicle (such as in conjunction with a lane marker detection so the system is aware of the lane delineations for the lane in which the equipped vehicle is travelling). As can be seen with reference to FIGS. 2 and 3, when a lane splitting vehicle 30 (FIG. 3) is determined to be approaching from the rear left side of the equipped vehicle 40, the control system may steer the vehicle to the right, while remaining within the lane that the equipped vehicle occupies (in other words, moving the vehicle towards the right side lane marker but without making a lane change). Such movement allows for more room for the lane splitting vehicle to pass at the left side more safely. After the lane splitting vehicle passes, the system may control the equipped vehicle to move back towards the center of the occupied lane, and then may travel with the traffic flow along the occupied lane.

Optionally, the system may similarly determine when a vehicle is driving along a center lane (such as for example, where, such as in Russia, vehicles typically drive along center lanes in high traffic conditions), and may control the equipped vehicle accordingly. For example, the system may, responsive to a determination that vehicles are traveling along the center lane (or where vehicles are queuing or traveling regardless of lane delineations), control the equipped vehicle to follow those vehicles to enhance traffic flow, even if it requires moving the equipped vehicle out of the occupied marked lane of the road. Such a function may utilize image processing and/or data processing of outputs of various sensors, such as, for example, cameras of a surround view system, a windshield mounted forward facing camera, a blind spot radar or lidar sensor or the like.

Figure 4:
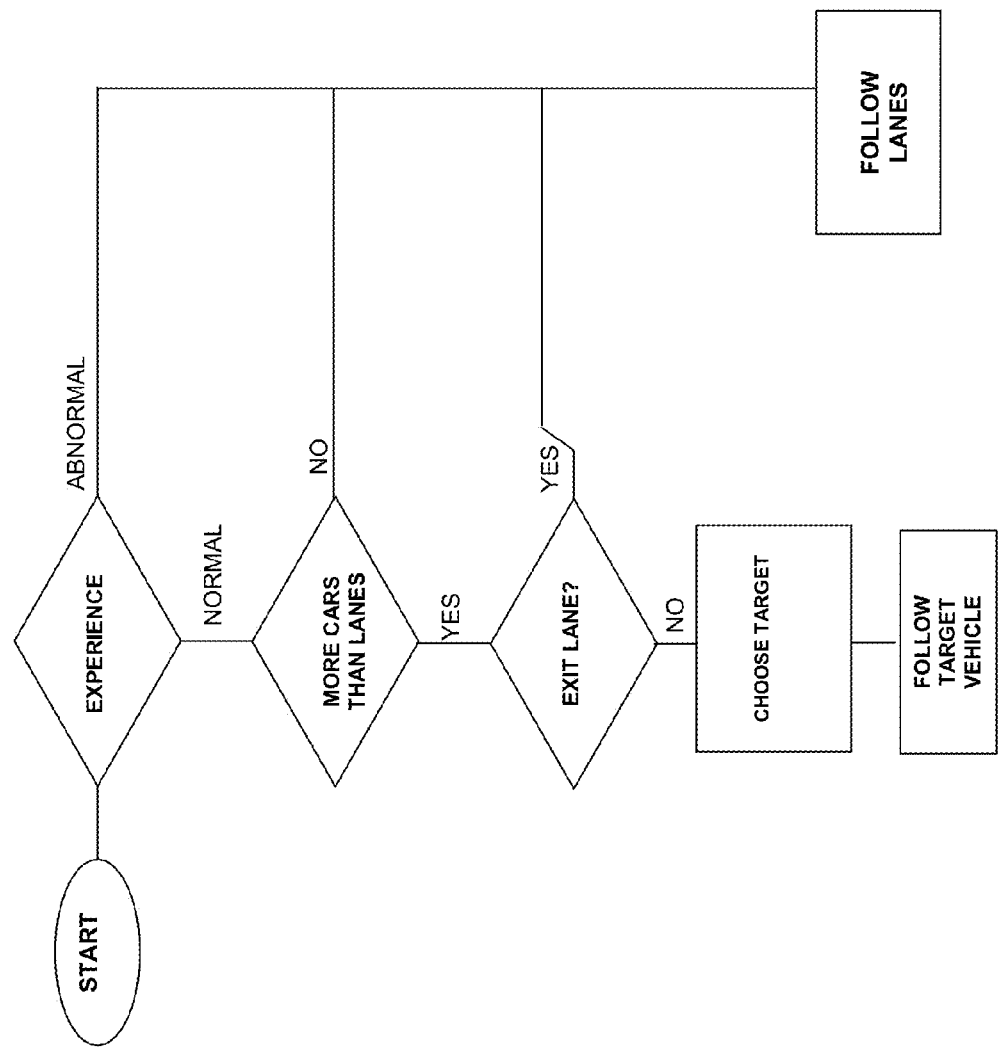
FIG. 4 is a flow chart of the vision system control of an equipped vehicle in accordance with the present invention, showing vehicle control in an expanding lane situation.
Figure 5:
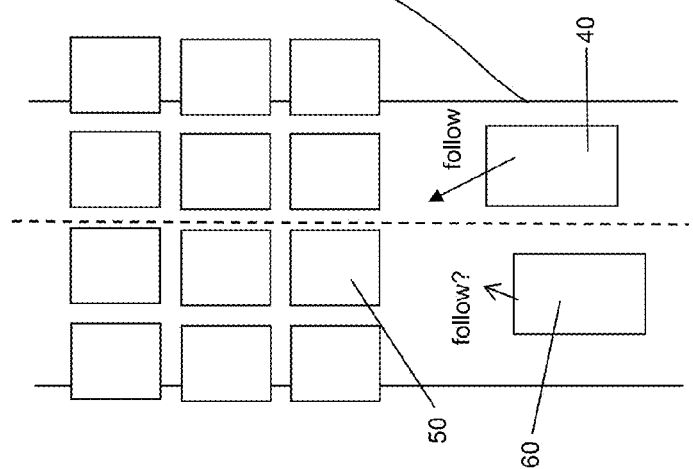
FIG. 5 is another schematic of how the vision system controls equipped vehicles in accordance with the present invention, showing vehicle control in an expanding lane situation.

Optionally, the system may determine when vehicle travel or vehicle "lanes" are different from the lanes marked on the road, and may control the equipped vehicle to follow one of the leading vehicles. For example, and with reference to FIGS. 4 and 5, the control system may detect an increase in traffic or a shift in traffic ahead of the equipped vehicle (such as when there are more lanes of vehicles than road lanes) and may determine which path or line of vehicles to follow. The system may select a faster moving line of vehicles or a particular side or direction (such as, for example, the right side line of vehicles when the equipped vehicle is approaching an exit or right turn along its selected or predetermined route), and may control or steer the vehicle to follow the vehicles of the selected line of vehicles. The system thus selects or chooses a target vehicle to follow, which may be a faster vehicle and/or may be partially occupying the road lane that the equipped vehicle is traveling, and such a selection may be based at least partially on the intent of a vehicle adjacent to the equipped vehicle. For example, and as shown in FIG. 5, if the equipped vehicle 40 selects a vehicle 50 to the left to follow, but a left side adjacent vehicle 60 is moving to follow that vehicle (or otherwise indicates that it intends to follow that vehicle), the system may select a different vehicle to follow or may adjust the driving to fall in behind the adjacent vehicle or the like.

In such traffic situations, the system overrides any lane departure warning system or alert and steers the equipped vehicle outside of its occupied lane and may even continue to drive the vehicle along a lane marker and thus not in any marked lane during such a traffic condition, and may even drive the vehicle partially onto or fully onto a shoulder of the road to follow the selected line of vehicles. Optionally, the system may also utilize a navigation system and/or pavement detection or the like to make sure that the equipped vehicle stays on its intended or selected course or route when following vehicles outside of the road lanes. The system may alert the driver that the vehicle or system is entering this special driving mode before entering or commencing that mode and during the out of lane maneuvers.

When controlling the equipped vehicle in slow heavy traffic conditions, the system may determine that a better path involves a lane change, such as to follow a faster moving line of vehicles in an adjacent lane. Thus, the system may be operable to steer the vehicle to one side or the other to enter the adjacent lane when traffic permits. In such a situation, the system may determine when a gap between consecutive vehicles (a leading vehicle and a trailing vehicle following the leading vehicle along the same or similar path and/or in the same lane of traffic) in an adjacent lane is sufficient to begin moving over and into the adjacent lane, and the system may steer the vehicle towards and into that gap (and may actuate the turn signal accordingly, if such turn signal use is appropriate), such as in a manner that allows the following vehicle behind the gap to slow to allow the equipped vehicle to enter the gap. The system may be operable to determine when the other vehicles do not allow such a lane change maneuver (such as when the other vehicle does not slow down to allow the lane change maneuver), and may return the vehicle to its lane and try again at a later gap. The system may adjust its control or sensitivities responsive to the geographical location and/or driving behavior of the other vehicle drivers, and may learn or adapt responsive to the current driving conditions and driving behaviors.

Figure 6:
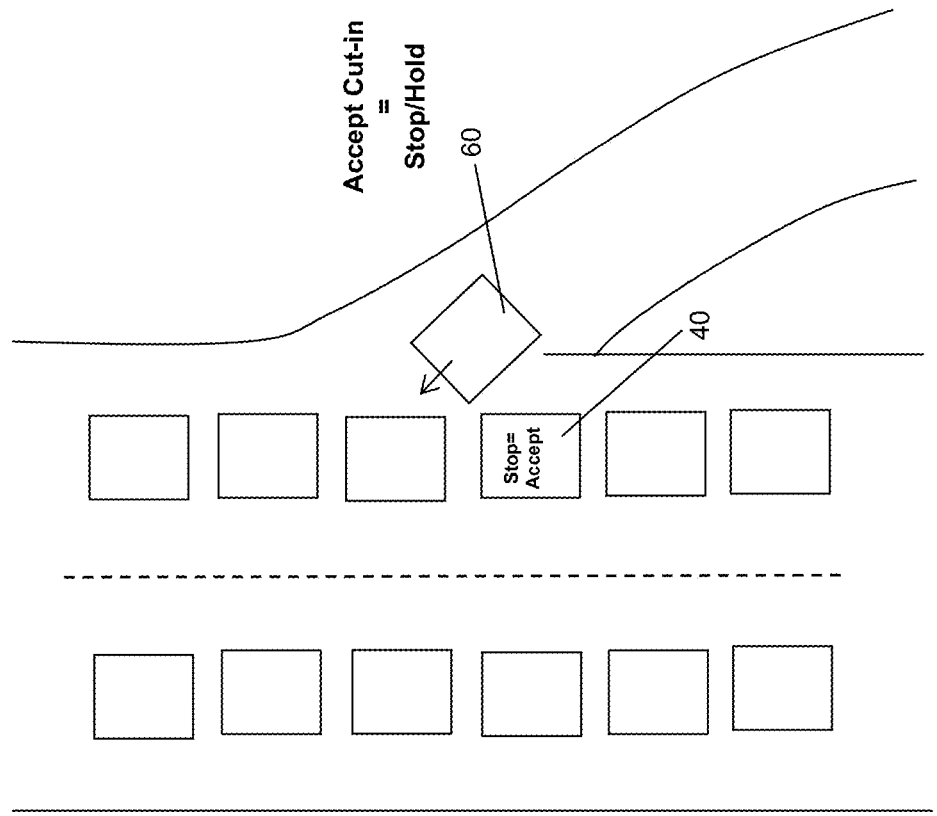
FIG. 6 is another schematic of how the vision system controls equipped vehicles in accordance with the present invention, showing vehicle control in a lane merging situation when the equipped vehicle accepts another vehicle's attempt to merge ahead of the equipped vehicle.
Figure 7:
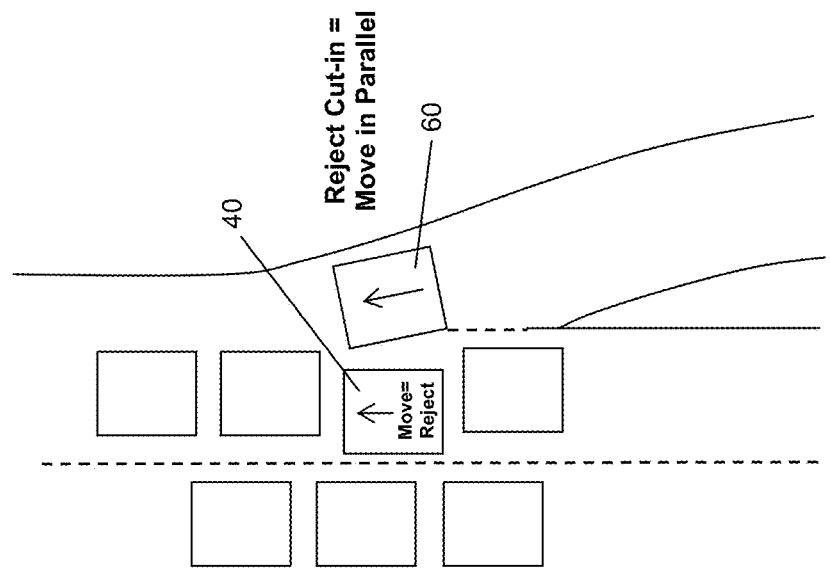
FIG. 7 is another schematic of how the vision system controls equipped vehicles in accordance with the present invention, showing vehicle control in a lane merging situation when the equipped vehicle rejects another vehicle's attempt to merge ahead of the equipped vehicle.

Likewise, when driving in slow heavy traffic conditions, the system may determine when another vehicle driver wants to cut into the lane of the equipped vehicle ahead of the equipped vehicle. Responsive to such a determination, the system may (such as shown in FIG. 6) slow or stop the equipped vehicle 40 to allow for the other vehicle 60 to cut in, or may (such as shown in FIG. 7) move the equipped vehicle 40 to the side to reject the cut in but partially allow the other vehicle 60 to continue traveling (where eventually the other vehicle should slow and fall in behind the equipped vehicle), depending on the particular driving conditions and traffic flow and traffic situation. The system may adapt or calibrate its sensitivity or processing so that, after one vehicle cuts in, the system is less tolerant of other vehicles cutting in as well, to avoid a potential situation where the system stops the vehicle and allows a steady stream of other vehicles to cut in ahead of the equipped vehicle.

The system of the present invention may also be operable to determine the "body language" of other drivers or vehicles to determine the intent of the driver of the other vehicle. For example, in some areas, such as in China, some drivers open the door of the vehicle to signal and/or force merging into an adjacent lane or line of traffic. The system of the present invention is operable to determine such actions and control the vehicle accordingly (such as to slow the equipped vehicle to allow for the cut in when it is determined that the leading or merging vehicle has its door open). Such a determination may be made via image processing of captured image data by one or more forward facing cameras of the equipped vehicle or by processing of outputs of ultrasonic sensors or the like of the equipped vehicles.

Figure 8:
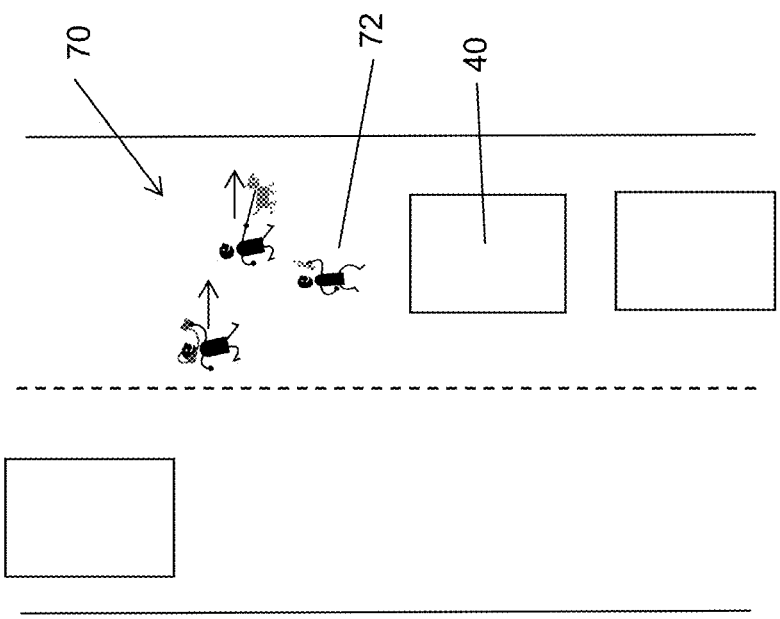
FIG. 8 is another schematic of how the vision system controls equipped vehicles in accordance with the present invention, showing vehicle control in pedestrian situations, where the vehicle stops when a non-moving pedestrian is in the immediate path of travel of the vehicle.
Figure 9:
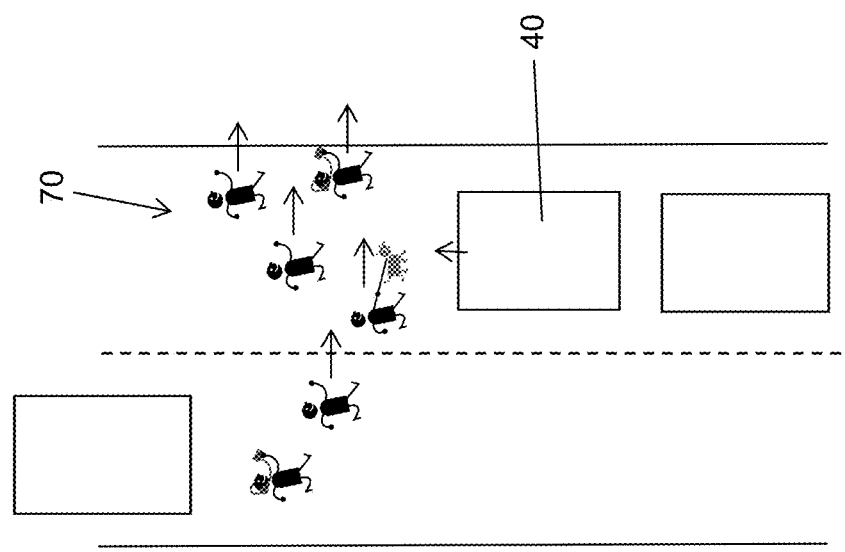
FIG. 9 is another schematic of how the vision system controls equipped vehicles in accordance with the present invention, showing vehicle control in pedestrian situations, where the vehicle moves slowly forward when moving pedestrians are in the path of travel of the vehicle or have a trajectory which could cross the path of the vehicle.

In all of the above high traffic or traffic jam situations, the system of the present invention may be operable to determine (such as via image processing of image data captured by side and/or forward facing cameras or night vision cameras, and/or outputs of radar sensors or ultrasonic sensors or lidar sensors of the equipped vehicle) the presence of one or more pedestrians at or near the equipped vehicle and ahead of the equipped vehicle. Responsive to a determination of at least one pedestrian ahead of the vehicle, the system may adjust control or driving of the equipped vehicle in order to ensure avoidance of any contact with the pedestrian or pedestrians by the autonomously driven or semi-autonomous equipped vehicle. For example, and with reference to FIGS. 8 and 9, responsive to a determination of the presence of a pedestrian or pedestrians 70 ahead of the equipped vehicle 40, the system may stop the vehicle or maneuver the vehicle so as to exclude any and all paths that are occupied or partially occupied by one or more stationary pedestrians. Optionally, when a stationary or non-moving pedestrian 72 (such as shown in FIG. 8), is determined to be present in the path of travel of the vehicle 40, the system may stop the vehicle to avoid collision with the non-moving pedestrian. When moving pedestrians 70 are detected (such as pedestrians crossing the road through the traffic), such as shown in FIG. 9, the system may determine a predicted path of the pedestrian or pedestrians and may maneuver the vehicle or slow the vehicle to make sure that the equipped vehicle avoids any conflict or potential conflict or collision with the crossing pedestrian.

Optionally, the system may drive the vehicle forward slowly, even when one or more pedestrians are determined to be in the path of travel of the vehicle (or determined to have a trajectory that will lead them into the path of travel of the vehicle if their trajectory persists), whereby the vehicle will continue to travel forward if the pedestrians move out of the way (the system can determine, such as responsive to detection of movement of the pedestrians ahead of the vehicle, that a collision with a pedestrian would not be immediate or imminent and may expect the pedestrians to walk out of the path of travel). The system thus may drive the vehicle slowly forward at a slow constant or substantially constant speed, so that the pedestrians can readily perceive the autonomous vehicle's intent and readily move out of the way of the slowly moving vehicle or change their trajectory to avoid the path of the slowly moving vehicle.

The present invention thus provides a system that is operable to determine the driving condition or traffic condition of the subject or equipped vehicle and, when that determined condition is indicative of a traffic jam or high traffic volume or slow moving traffic condition or faster moving traffic condition, the system may control the equipped vehicle (such as by controlling the brake system, the accelerator and steering system of the vehicle) to maneuver or drive the subject vehicle in the traffic. The system detects the surrounding vehicles and determines the appropriate driving direction and speed for the equipped vehicle to move the equipped vehicle with the traffic flow and to adapt the driving of the equipped vehicle to the surrounding vehicles and traffic flow. The system is operable to detect pedestrians and may slow or stop to allow for pedestrians to cross the road in front of the equipped vehicle as may occur in traffic situations, such as in a crowded city street or the like.

Optionally, the vision system may utilize rear image processing for lane detection. For example, the system may apply lane detection and tracking aspects from front image processing to rear images captured by one or more rearward facing cameras of the vehicle. The system may detect the lane markings and may determine the lateral distance to a left or right lane marking, and may control steering and/or provide an alert to the driver responsive to the detected distance to the lane markings. The system may utilize the rearward lane marking detection to provide enhanced detection of a lane splitting vehicle or motorcycle or scooter. The system thus provides increased availability of lane information to the driver, and may warn the driver even where lane departure prevention (LDP) from the front camera may not be available, such as in low lighting conditions or situations, traffic jams (when preceding vehicles block lane markings), tunnel entry and/or the like. Optionally, it is envisioned that the rear lane detection of the present invention may be used for autonomous driving/lane keeping where high lane data availability is important.

Optionally, the vision system of the present invention may be operable to provide other various functions. For example, the vision system may operate with or be associated with an adaptive automatic emergency braking (AEB) system of the vehicle, such that, when the subject vehicle determines that braking is desired or appropriate, the subject vehicle may, for example, brake earlier and/or harder, if no vehicle is following (as determined by image processing of the image data captured by the rearward facing camera), and risk of rear end collision is low, or may brake later, if the vision system determines that a vehicle is following, and the risk of rear end collision is higher. Optionally, the vision system may provide improved or enhanced lane detection at low sun/and increased availability of LDW based on detecting lanes in the rear camera images. Optionally, the vision system may provide rear pedestrian detection, and may provide a warning or may brake if a pedestrian is detected in the rear images, such as during a reversing maneuver of the vehicle. Optionally, the vision system may provide a rear object detection, and may provide a warning or the like if a general object is detected in the rear images. Optionally, the vision system may provide a rear cross traffic alert function, and may detect or determine crossing vehicles and may be operable to alert or warn the driver of the subject vehicle of crossing vehicles when the driver is reversing or backing up the subject vehicle. The system of the present invention may utilize aspects of the systems described in U.S. patent application Ser. No. 13/894,870, filed May 15, 2013, which is hereby incorporated herein by reference in its entirety.

The present invention may also or otherwise provide enhanced control or semi-autonomous driving features to assist the driver of the vehicle during high traffic conditions or situations, such as during a commute to or from work at rush hour type traffic. Commuter mobility has been constantly increasing over the past decades. The number of accidents shows the same tendency and is not decreasing significantly although new active and passive safety features are introduced in modern vehicles. Automated driving has the potential to improve the safety and productive time of commuters. However, many automated driving functions in development are equipped with expensive sensors. For automated driving to become affordable to the public it must be reduced in cost.

The present invention provides a limited semi-autonomous driving system for traffic jam situations that may operate with only a single mono-camera sensor (although clearly the semi-autonomous driving assist system of the present invention may operate using multiple cameras of the vehicle). The assist system is focused on relieving the driver of the mundane task of driving in heavy traffic. It is capable of operating in a low speed range and it does not require any additional HMI or actuation beyond what is already available in vehicles with Lane Keep Assist or Cruise Control or the like.

The present invention utilizes an algorithm that achieves a partially automated driving function while providing a cost-effective hardware setup. The environment sensing may be performed by a monocular camera only and the software may work on a single ECU.

The traffic driving assist system of the present invention may decrease the driver's workload in monotonous situations in congested traffic. The driver or user can activate the driver assist function in a slow traffic situation to relieve monotony. Because the system of the present invention may be intended to be a comfort function for congested traffic on well-structured roads, optional preconditions for activation of the system may include the availability of lane markings and existence of a preceding vehicle within a certain distance. The user may activate the system during a traffic condition by activating a user input, such as by pressing a button or the like. After this, the driver no longer needs to provide steering, accelerator or brake pedal input while in the traffic condition. The driver assist function will take over the lateral guidance of the equipped vehicle and keep it generally centered in the lane. Also, the longitudinal behavior is controlled by the system to follow the closest target vehicle in the same lane (Same Lane Target), maintaining an appropriate amount of distance or gap between the target vehicle and the equipped vehicle. If the target vehicle stops then the equipped vehicle will come to a stop close behind the target vehicle and will resume driving if the target vehicle then continues, all without any further input needed from the driver of the equipped vehicle.

The system user may still be responsible for the vehicle and its motion. Thus, while the vehicle driving is automated, the driver may monitor the system and can intervene if necessary. Also, the driver may override the system (such as by taking control of the steering or acceleration) at any time.

If the automated operation of the system falls outside of its operational bounds or is becoming unsafe (such as, for example, if the target vehicle is no longer tracked ahead of the equipped vehicle), the system may be operable to warn the driver and request driver takeover of the vehicle. The system may continue to control the vehicle in the safest manner possible with limited information until the driver takes over control of the vehicle. This provides time for a possibly inattentive driver to react to the system request or alert. If the driver does not act within a certain amount of time following the warning or alert, the system may disengage or enter a safe state and gently slow the vehicle to a stop.

The system requirements and operational parameters may be derived from an analysis of traffic jam data collected with human drivers. For example, the velocity range in which the system may operate may be defined to allow automated driving in most traffic jam scenarios, such as at speeds below about 70 km/hr (data has shown that 99 percent of the traffic jam driving speed range is below 70 km/hr). Thus, in order to cover these situations and also to accommodate urban speed limits in the U.S., the maximum speed at which the system may control the vehicle may be set to about 72 km/hr (or about 45 mph).

Traffic data shows that acceleration values occurring in congested traffic are mostly below about 1.5 m/s$^2$, so the limit of the system may be set to this value, especially to allow quick starting after standstill without opening a large gap to the preceding vehicle. For deceleration in regular driving situations, a threshold of about −1.3 m/s$^2$ is reasonable, since most of the situations can be handled within this range. The global minimum of the allowed deceleration was set to 4 m/s$^2$ to also enable the system to react to more critical situations, such as, for example, close cut-in maneuvers or the like. More critical scenarios can be handled by designated safety functions with higher deceleration (such as an Automatic Emergency Braking (AEB), which may be based on the same camera system, and which may be implemented as a backup system to take control if the driving situation encountered is rated too critical for the traffic assist system).

Because the system is at first intended for motorway use, the radius of the driven trajectory can be assumed to contain no sharp bends. Therefore, a minimum radius of curvature of the road trajectory may be defined to be, for example, about 180 m. The maximum duration of system operation without any driver interaction may be restricted in order to insure that the driver's attention will not drift and that he or she is still alert. This time period may be set to, for example, about 120 seconds before a driver reaction is actually requested by the system.

To ensure the compatibility of the system to a variety of different vehicles, the global structure of the architecture allows for modularity. The same code can therefore be used in different setups or vehicles.

Figure 10:
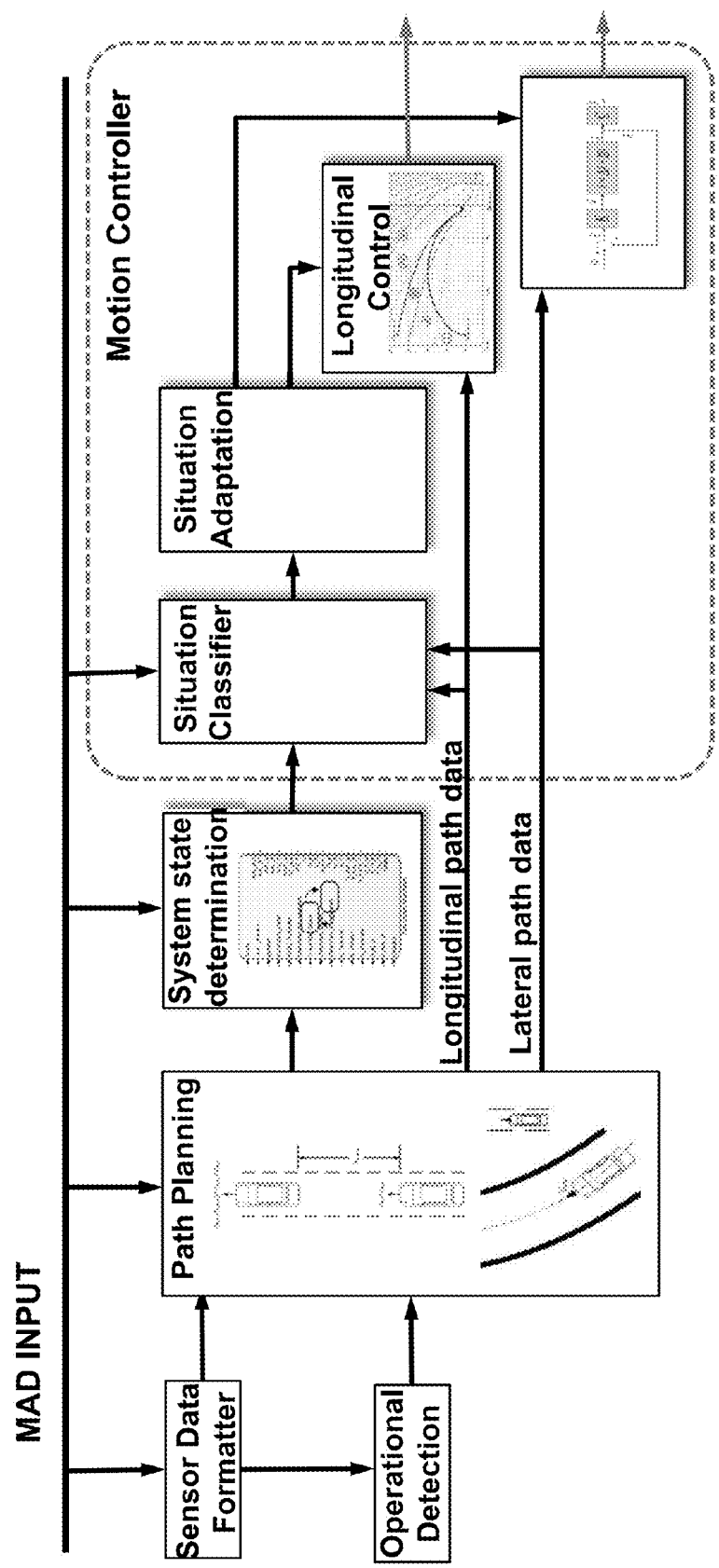
FIG. 10 is a schematic of the functional structure of the traffic assist system of the present invention.

The functional structure of the system of the present invention is shown in FIG. 10. The Path Planning module calculates the desired behavior based on the sensor data. First, the Target Object Selection module extracts and flags the traffic objects which are relevant for the decision. Afterwards, the actual longitudinal and lateral pathing is defined. Based on the condition of the vehicle and the targeted path data, the global system status is determined within a state machine. This status determines if the system is enabled and the function is ready to be activated. Because the lateral and longitudinal guidance can be active at the same time or independently there, are states for all three possibilities. Additionally, a Safe Mode state may be implemented for the case that a safe operation cannot be guaranteed, such as, for example, when there is an extended period of driver unresponsiveness.

To adapt the controller characteristics to the particular driving situation, such as, for example, slow constant following, the situation is classified based on environmental, ego-vehicle or subject vehicle or equipped vehicle and path planning data. Class parameters are adapted according to the detected situation. Because the vehicle dynamics in both lateral and longitudinal dimensions are highly dependent on the actual velocity of the vehicle, the control parameters are also continuously adjusted in relation to the SV's current speed. The two controllers for longitudinal and lateral guidance generate the actual control signals that are sent to the vehicle interface. The lateral controller is implemented as a state controller and the longitudinal guidance is implemented as a sliding-mode controller.

Figure 11:
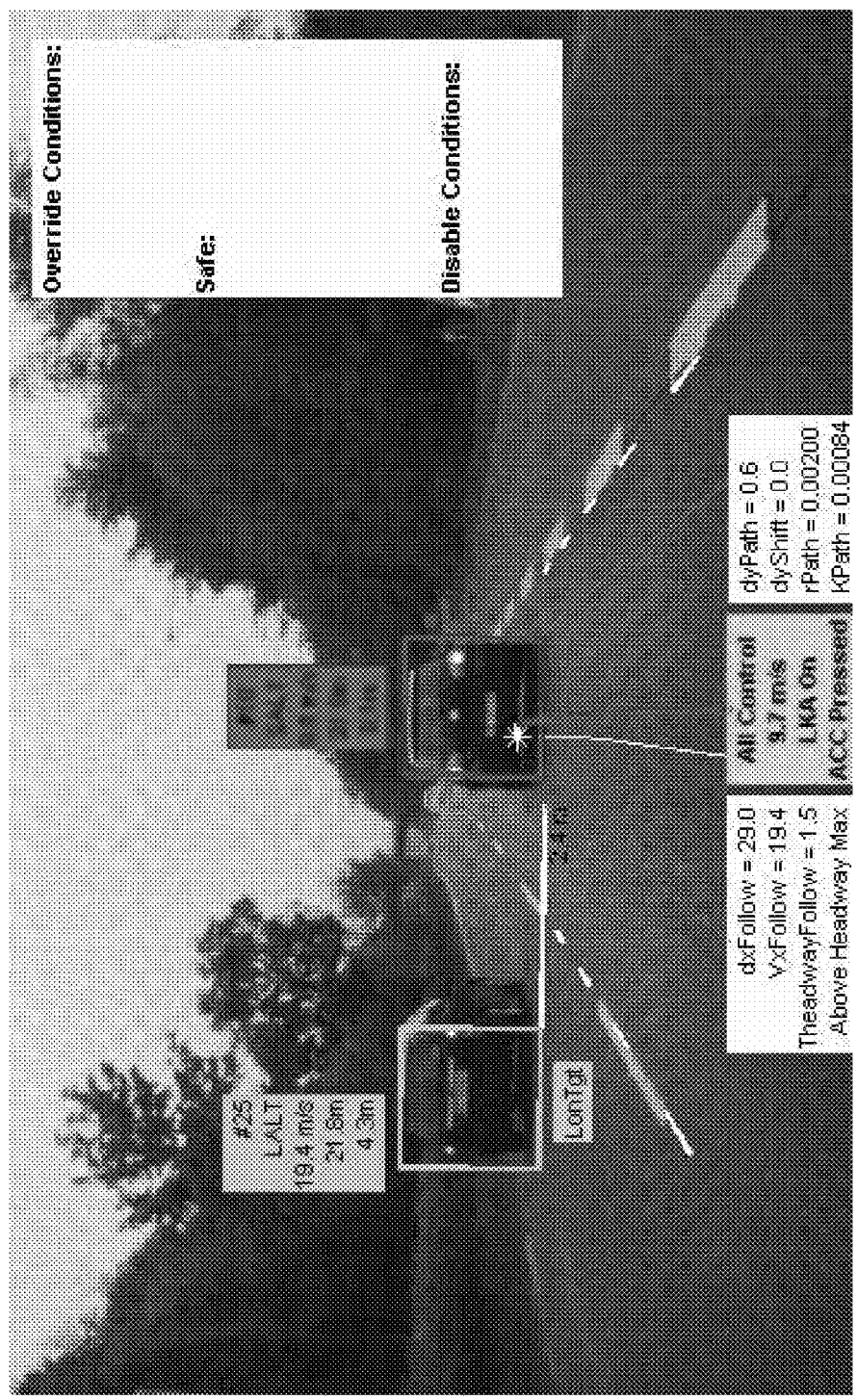
FIG. 11 is an image showing an overlay of object selection and path planning data for use in system analysis.

The task of the Path Planning module is to take into account the environmental information provided by sensor perception and generate the trajectory. The preceding vehicle in the same lane (the Same Lane Target or SALT) usually has the most significant influence on the longitudinal trajectory. If calibrated to prevent overtaking on the right, which is illegal in many states, the closest target in the left adjoining lane (LALT) is also relevant if it is closer and moving more slowly than the SALT. The selection of all these relevant targets and calculation of their trajectories is the task of the Target Object Selection. An example for tagged objects is shown in FIG. 11. Also, some of the calculated output of the Path Planning module can be seen at the lower region of FIG. 11.

To determine the particular lane, in which the detected vehicle is located, the lane position is extrapolated based on the approximation:

$$y_{tgt} = y_{lane} + r_{lane} \cdot x_{tgt} + \frac{1}{2} \cdot K_{lane} \cdot x_{tgt}^2 \quad \text{Eq. 1}$$

where $y_{tgt}$ is the lateral position of the lane marking at the longitudinal position $$x_{tgt} v_{tgt} \leq \frac{x_{stop,max}}{v_{tgt}}$$

of the target, $y_{lane}$ is the relative heading angle between SV and the lane and $K_{lane}$ is the curvature of the lane. The input values describing the lane and objects are provided by the camera sensor and then recalculated by Path Planning.

In a situation where the left lane target vehicle (LALT) or right lane target vehicle (RALT) is determined to be uncomfortably close to the lane markings, then the path may be adapted to increase lateral separation. If only a single marking can be successfully tracked then the detected lane's information is mirrored for a certain time period under the assumption that the width of the lane is not changing quickly. After this duration, the virtual lane width is slowly reduced to a minimum to allow lateral guidance as long as possible. In the event that no lane markings are available or the distance to the SALT is small at a low velocity, the lateral path is based on the track of the SALT.

The fundamental longitudinal trajectory calculates the necessary target distance $x_{follow}$ and relative velocity to the SALT to maintain headway $t_h \underline{x} = [\dot\psi, \beta, \delta, r, dy]^T \psi$, according to:

$$x_{follow} = t_h \cdot v_{tgt} \quad \text{Eq. 2}$$

where $v_{tgt}$ is the target vehicle's longitudinal velocity.

The analysis of traffic jam data has revealed that human drivers tend to maintain a headway time from up to 2 seconds. While it varies by state and country, law may specify a following time of 2 seconds as well. Thus, the headway time is set to $t_h=2$ s. An additional benefit of this setting has been observed while driving in real traffic. The spacious gap size between the SV and the preceding vehicle may result in cut-in maneuvers of other road users to not be too close. The function can more easily handle this critical situation with an extra distance to the cut-in vehicle.

The system is designed to stop the SV behind a stationary vehicle at the stopping distance $x_{follow} \geq x_{stop,min} = 4$ m y. For comfort and safety, the value also has some safety distance added, compared to human drivers who stop at a distance of about 2.5 m on average.

A Slow Mode condition has been implemented to treat the low speed approach to a slow moving preceding vehicle. It is triggered if:

$$v_{tgt} \leq \frac{x_{stop,max}}{t_k} \quad \text{Eq. 3}$$

In this case $x_{follow}$ is set to $x_{stop,max}=6$ m to allow slow approaching and adaptation of the controller characteristic. As soon as the lead vehicle has stopped Stop Mode becomes active ($x_{follow}=x_{stop,min}$) and a smooth stop of the SV can be initiated by the controller.

Because availability and viewability and discernibility of lane markings is important for robust and accurate lateral guidance, the longitudinal Path Planning accounts for lane visibility. Hence, if the system is not in Slow Mode, the minimum targeted distance to the SALT is set to $x_{stop}=10$ m to guarantee visibility even for obscured or intermittent markings on motorways.

Figure 12:
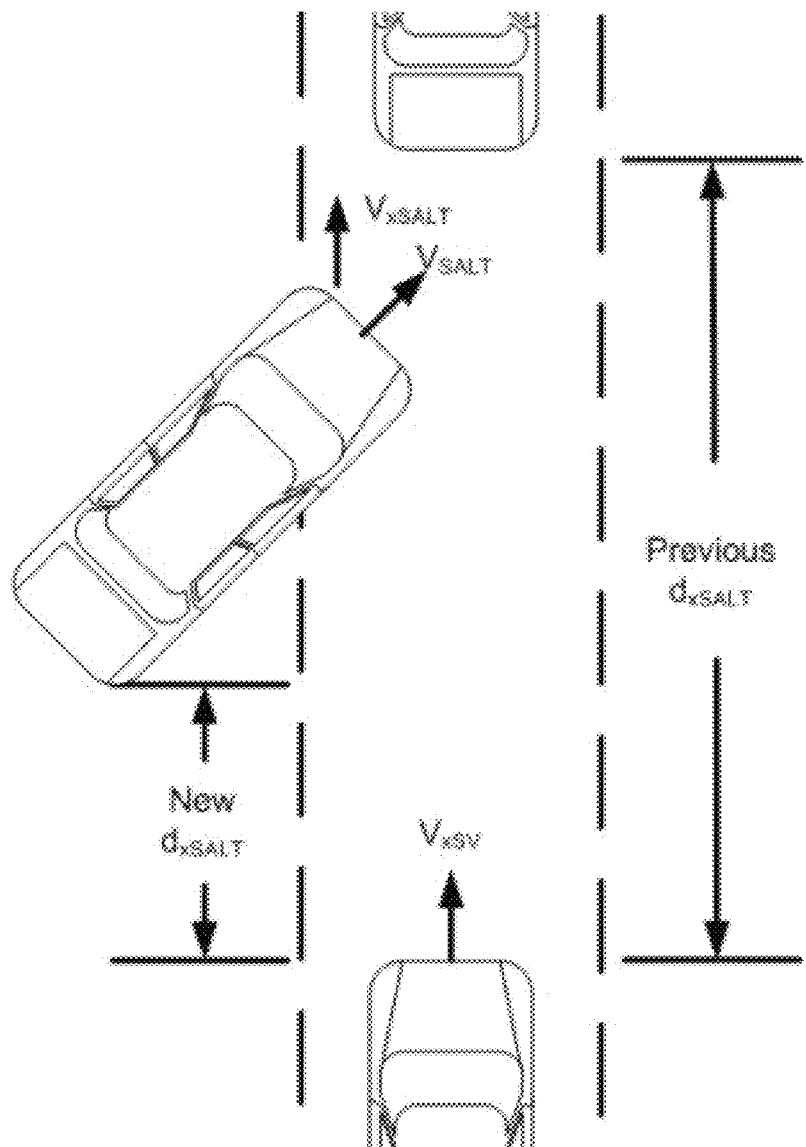
FIG. 12 is an example of the operation of the traffic assist system of the present invention.

As a safe response to vehicles which are cutting in or driving hazardously, vehicles that are detected to be partially in or near the SV's lane are immediately treated as the new SALT object. An example for this approach is visualized in FIG. 12.

Several methods are used to detect and respond to a close cut in situation. Before an effective tracking of this vehicle is possible, the system may generate an alert or warning flag, issued by the image processor, to report a close cut-in. When this alert is provided, the controller responds by commanding a gentle deceleration as a first reaction. Once the new SALT is identified, the step in the measured distance to the relevant target $x_{tgt}$ (such as at 36 seconds) reveals the first tracking of the merging vehicle. As soon as the tracking allows an appropriate adjustment of the gap, the full deceleration is sent to the interface. In spite of the critical cut-in at about 4.5 m in front of the SV, uncomfortable jerks in the actual acceleration $\alpha_{act}$ can be avoided while the situation is resolved by the function.

One principal situation, which the system has to deal with, is the handling of stop-and-go traffic. When a preceding vehicle comes to a halt, the SV slowly approaches the stopped vehicle with a low, nearly constant velocity. When having reached about $x_{tgt}=6$ m, deceleration is commanded to smoothly stop the vehicle. When the preceding vehicle starts again a quick response is crucial. After the leading or target vehicle starts to move and reaches the distance threshold ($x_{tgt}=4.5$ m), the SV starts within 0.5 s. This ensures an immediate following without opening a substantial distance gap greater than the desired headway.

After the target trajectory is available, the lateral and longitudinal controllers' task is to output the particular commands to the vehicle interfaces. Lateral and longitudinal guidance are intended to also be working separately. Thus, two parallel controllers are preferred to an integrated concept.

Based on the desired trajectory and the SV state, the driving situation is classified. This allows an adaptation of the characteristics of the controller to provide a comfortable and safe vehicle motion without any high acceleration or jerk in either dimension.

Figure 13:
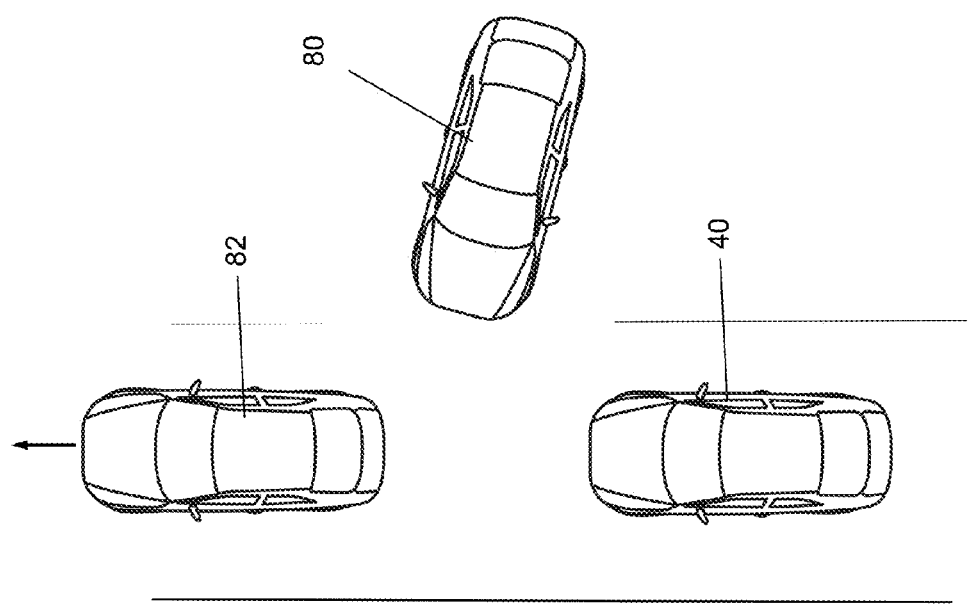

Optionally, the vision system of the present invention may be operable to detect when the subject vehicle or equipped vehicle is not moving or moving slowly and is blocking a driveway or intersection and there is another vehicle that is trying to pull out into the lane occupied by the subject vehicle. Depending on the location of the other vehicle relative to the equipped vehicle, the system may stop the subject vehicle to allow the other vehicle to pull into the lane ahead of the subject vehicle or the system may move the subject vehicle forward to allow sufficient space behind the subject vehicle for the other vehicle to at least partially pull out into the lane behind the subject vehicle. For example, and as shown in FIG. 13, if the other vehicle 80 is near the front of the subject vehicle 40, such as forward of the front axle of the subject vehicle, then the system may apply the vehicle brakes to hold the vehicle's position to allow the other vehicle to pull into the lane of traffic ahead of the subject vehicle. Optionally, in such a situation, the system may also flash the head lights or honk the horn or provide some other signal to indicate to the driver of the other vehicle that they can proceed ahead of the subject vehicle.

Figure 14:
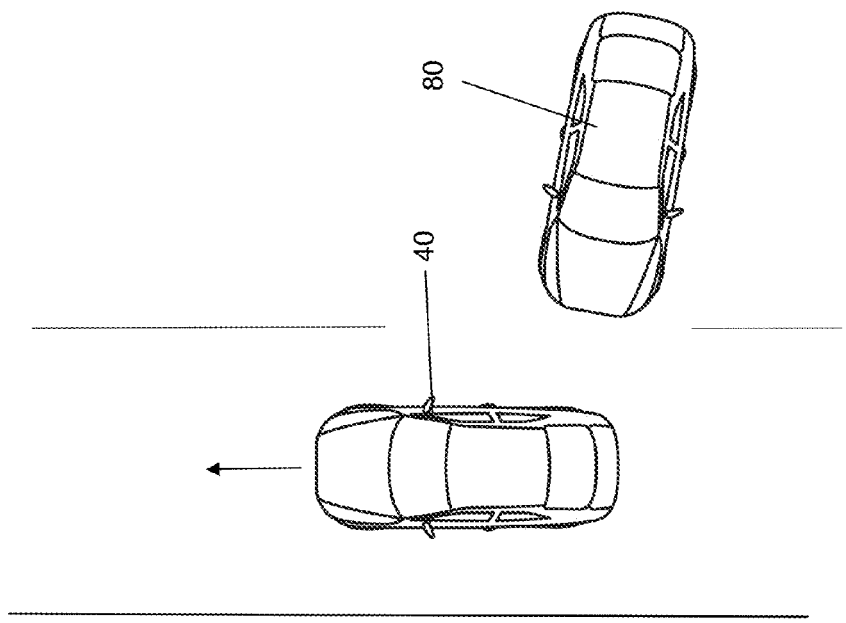

Also, for example, and as shown in FIG. 14, if the other vehicle 80 is near the rear of the subject vehicle 40, the system may control the vehicle brakes and accelerator to creep forward to allow for the other vehicle 80 to pull into the lane of traffic behind the subject vehicle. In such slow moving traffic conditions, the system may provide a resting distance or gap between a leading vehicle, such as about five meters or thereabouts, so creeping forward a little would take up some of the resting distance or gap, while still spacing the subject vehicle from the vehicle ahead of the subject vehicle. For example, if the system leaves about five meters between the subject vehicle and the leading vehicle in slow moving traffic conditions, the system may allow the subject vehicle to creep forward about 2.5 meters or thereabouts (even though the leading vehicle has not moved forward or has moved forward less than that amount), which would allow sufficient room for the other vehicle to pull into or at least start to pull into the lane behind the crept forward subject vehicle (while still leaving a safe gap between the subject vehicle and the leading vehicle). It would then be up to the vehicle initially behind the subject vehicle to stay put and allow the other vehicle to pull into the lane ahead of them.

Optionally, the system of the present invention, when the subject vehicle is in the trailing vehicle position (where a leading vehicle 82 (FIG. 13) creeps forward to make room for another vehicle to pull in behind the leading vehicle), the system may determine when the leading vehicle creeps forward and may apply the brakes so as to not follow the forward movement, so that the other vehicle has sufficient room to pull into the lane ahead of the subject vehicle.

Figure 15:
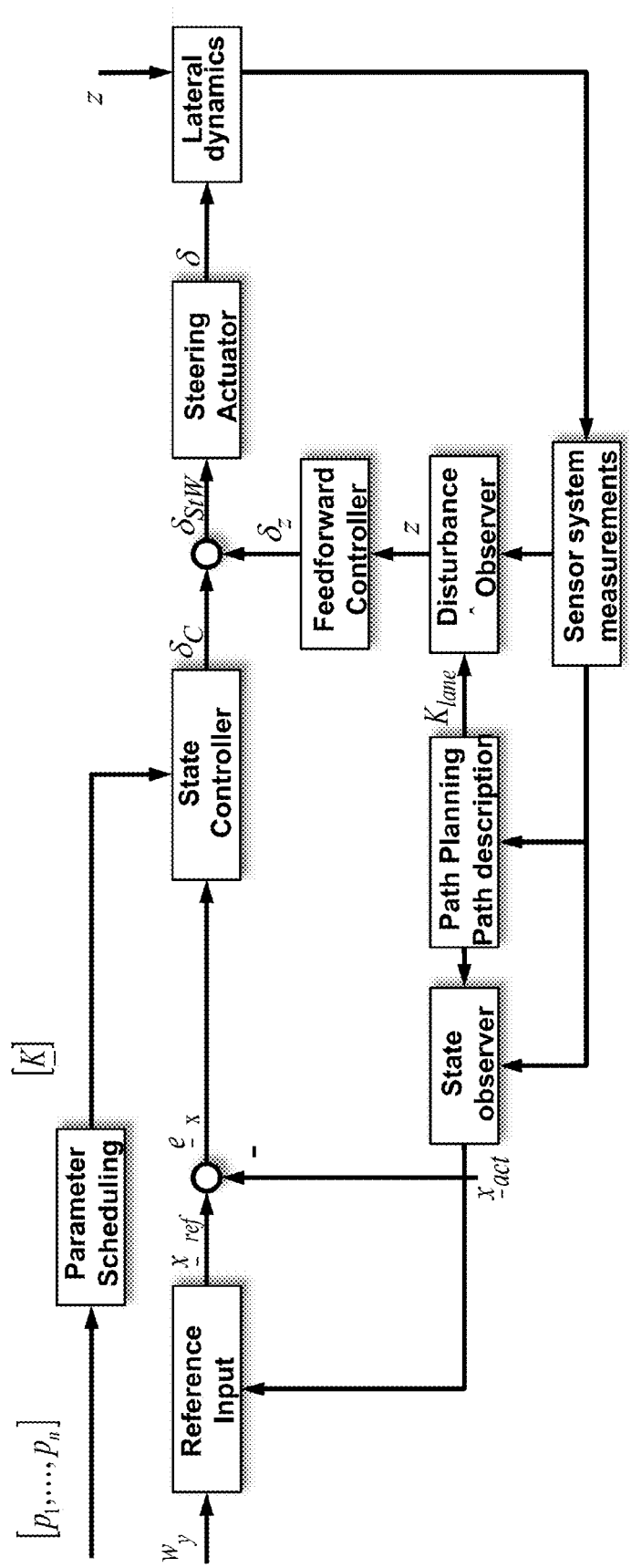
FIG. 15 is a schematic of the functional principle of the lateral controller of the system of the present invention.

Lateral Control:

For lateral guidance, good results can be achieved with a state space controller. The system of the present invention controls lateral movement in this way, and its functional structure can be seen in FIG. 15.

The concept is based on a state space representation of the controlled system. Herein, the state of the system is expressed by a vector of quantities, which are significant for the dynamic behavior of the system. In this case an expansion of the linear bicycle model leads to a 5-element state vector:

$$\underline{x}=[\dot{\psi},\beta,\delta,r,dy]^T \quad \text{Eq. 4}$$

consisting of yaw rate $\dot{\psi}$, slip angle $\beta$, front wheel steering angle $\delta$, heading angle between SV and trajectory r and lateral deviation from trajectory y. The basic idea is to control each quantity separately with a proportional controller and by this apply the desired stable dynamic behavior to the closed loop.

The avoidance of stationary errors in the lateral deviation from the target trajectory is achieved by an additional parallel integral part for this entity.

Following the lateral trajectory requires a certain reference value for every state. The reference values are calculated as a vector $\underline{x}_{ref}$ in the Reference Input module. The current state $\underline{x}_{act}$, based on measurements and estimations, is gathered in the State Observer, closing the feedback loop.

The curvature of the trajectory can be modeled as an external disturbance. This can be reduced or eliminated by a feed forward controller based on geometrical calculations, which adding the steering angle $\delta_z$ to compensate. Other measurable disturbances, such as, for example, the road bank angle, may also be eliminated in this manner.

The Situation Adaptation is represented by the Parameter Scheduling module, which in every time step delivers a tuned parameter set $\underline{K}$. This set is taking into account the situation and in particular the current velocity.

Figure 16:
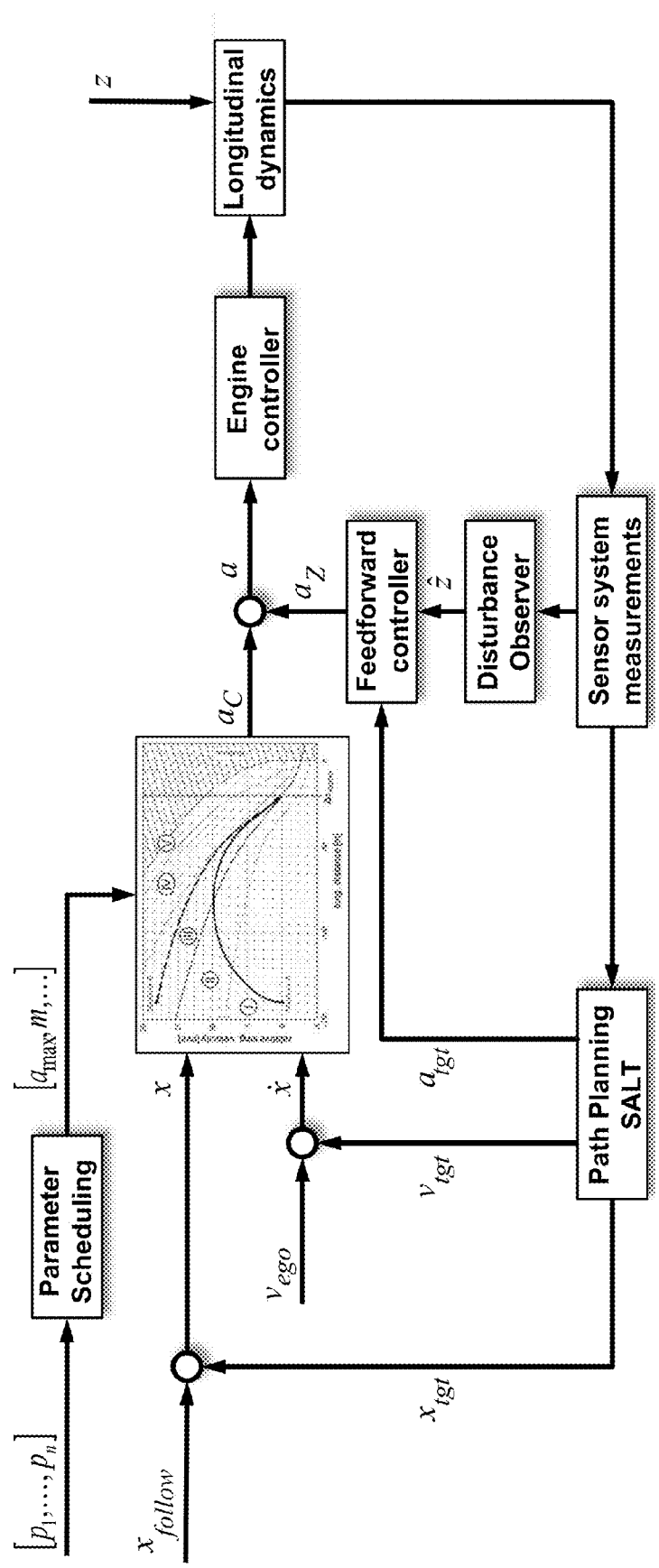
FIG. 16 is a schematic of the functional principle of the longitudinal controller of the system of the present invention.

Longitudinal Control:

The longitudinal controller of the traffic assist system may be implemented as a derivation of a sliding mode controller (SMC). The system's dynamic state with respect to the target is describe in a phase space spanned by the distance x and its derivative $\dot{x}$, which can be measured as the relative velocity. Within this space, the desired dynamic behavior while reaching a target point (in this case $x=x_{follow}$, $\dot{x}=0$) is described by a 2-dimensional function (referred as the sliding surface). The location of the current dynamic state in relation to this function determines the acceleration output. These commands are fed into the engine controller (see FIG. 16).

The feed forward controller can take into account external disturbances such as the road slope or wind forces. Furthermore, the measured acceleration of the relevant target can be compensated.

Figure 17:
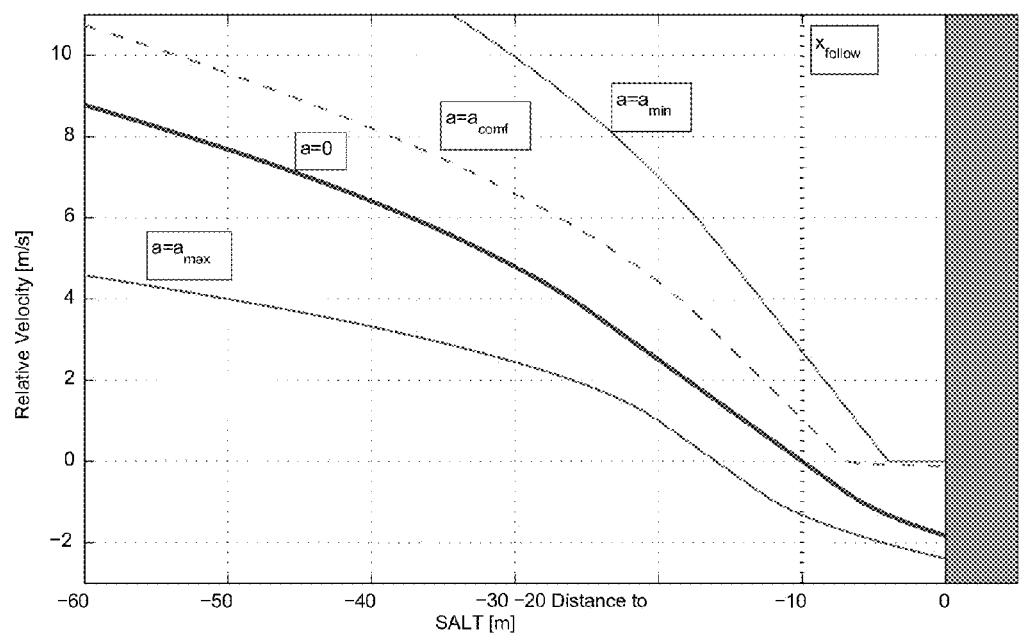
FIG. 17 is a chart showing an exemplary location of the sliding surface (a=0) and defined areas in the phase space for $$t_k = 1 \text{ s}, v_{ego} = 10 \text{ }\frac{\text{m}}{\text{s}}.$$

In a classic SMC, the output may be switched between the minimum and maximum acceleration. This leads to an uncomfortable behavior in a real system, because the actuators are not working infinitely fast (referred as "chattering"). Thus, linear transitions based on the distance of the current state (i.e. point in phase space) in relation to the sliding surface may be implemented to achieve a continuous output. Specific areas, where, for example, the maximum acceleration is applied, are defined by additional surfaces in the phase space as depicted in FIG. 17.

The parameters defining the shape and position of the surfaces may be adapted by the Situation Adaptation module, especially to make low-speed driving more comfortable. This virtually adds a third dimension to the phase space.

The use of this adapted SMC allows an intuitive specification and parameterization of the longitudinal behavior of the SV. The identical controller can be used for implementation in different vehicles by adapting the subsidiary engine controller to the vehicle characteristics.

Unlike a cruise control, a number of factors must be present before the traffic assist system of the present invention can safely activate. Optionally, the system may include an adaptive cruise control (ACC) type of interface. Optionally, for situations when the system does not activate when the driver selects the system, an indicator may be provided with symbols or indicia to indicate to the driver what is preventing the system from operating. For example, if the target vehicle is not detected, the system may highlight a figure of a leading car in yellow. To reduce confusion about the system state and warnings without diverting too much attention from the road, audible or voice alerts may be provided. For example, the activation of the system may be confirmed by the spoken message "Automated Drive Active".

When the system of the present invention is in use, there is a possibility that the increasing degree of automation may cause the driver's alertness and attention to drift more quickly. To keep the driver alert and "in the loop", precautions may be taken. Optionally, if the system does not detect any driver interaction for a certain period of time, the system may request a certain driver reaction, such as, for example, pulling an ACC lever or input, which may correspond to a re-activation of the traffic driving assist function. The driver may perform this action at any time within the period to reset the time counter. If the driver does not perform the required input within the time period following the request or alert, the demand for this reaction may be achieved by a low priority warning with a text or iconistic or audible message for the driver. If no reaction of the driver is still detected, the system may request the driver to take over the guidance and otherwise will transition into a Safe Mode and slow the vehicle to a stop.

Therefore, the present invention provides a traffic jam assist function using a mono-camera as the principle sensor. With a low cost sensor, the system can provide improved driving conditions for many commuters. Optionally, the system may include integrating a detection and response to traffic signs and traffic lights and other road features to allow compliance with traffic rules while driving automated are to be integrated. Automated lane changes may be provided on basis of low cost sensor fusion and environmental modeling. These features, complimented by increased confidence in the system, will allow the system to optionally operate at higher speeds and to operate without another vehicle to follow.

Optionally, the present invention may be operable to determine if a vehicle ahead of the subject vehicle changes course as it travels through a "blind" intersection, whereby the system may determine that such a change in course is indicative of a lane shift or an object ahead of the subject vehicle. There are many intersections that are crested. In some cases, it is because one road used to be the through-way while the other had to stop (and now there is a traffic light) or it might be due to coming up a hill and crossing a road that rides along the ridge (such as with some streets of San Francisco).

In such intersections, it can be difficult to determine where vehicle is supposed to travel on the other side of the intersection. If the vehicle moves very slowly through the intersection, the vehicle will crest the intersection and the driver can see where he or she is supposed to steer the vehicle. If the driver lives in the area, he or she might know that the other side of the intersection splits into 2 lanes, or jogs a little to one side to make room for a left turn lane on the other side or the like. However, if the driver is unfamiliar and travelling at posted speeds through the intersection, it may be a bit of a surprise to find out the lane has shifted.

One of the biggest clues is the vehicle traveling ahead of the equipped or subject vehicle. If the leading vehicle crosses the intersection and moves to one side, the system (via processing of data captured by the forward facing camera or sensor) can use this information as a clue for the self-guided vehicle (in the absence of onboard maps that may show how the road changes at the intersection). The system, responsive to a determination of a shift by the leading vehicle, is operable to adjust the course for the subject vehicle as it crosses the intersection, and may then further adjust the course as the view unfolds as the vehicle continues across the intersection.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or PCT Application No. PCT/US2014/042229, filed Jun. 13, 2014, and/or U.S. patent application Ser. No. 14/524,203, filed Oct. 27, 2014; Ser. No. 14/519,469, filed Oct. 21, 2014; Ser. No. 14/391,841, filed Oct. 10, 2014; Ser. No. 14/489,659, filed Sep. 18, 2014; Ser. No. 14/446,099, filed Aug. 22, 2014; Ser. No. 14/377,940, filed Aug. 11, 2014; Ser. No. 14/377,939, filed Aug. 11, 2014; Ser. No. 14/456,164, filed Aug. 11, 2014; Ser. No. 14/456,163, filed Aug. 11, 2014; Ser. No. 14/456,162, filed Aug. 11, 2014; Ser. No. 14/373,501, filed Jul. 21, 2014; Ser. No. 14/372,524, filed Jul. 16, 2014; Ser. No. 14/324,696, filed Jul. 7, 2014; Ser. No. 14/316,940, filed Jun. 27, 2014; Ser. No. 14/316,939, filed Jun. 27, 2014; Ser. No. 14/303,696, filed Jun. 13, 2014; Ser. No. 14/303,695, filed Jun. 13, 2014; Ser. No. 14/303,694, filed Jun. 13, 2014; Ser. No. 14/303,693, filed Jun. 13, 2014; Ser. No. 14/297,663, filed Jun. 6, 2014; Ser. No. 14/362,636, filed Jun. 4, 2014; Ser. No. 14/290,028, filed May 29, 2014; Ser. No. 14/290,026, filed May 29, 2014; Ser. No. 14/282,029, filed May 20, 02014; Ser. No. 14/282,028, filed May 20, 2014; Ser. No. 14/358,232, filed May 15, 2014; Ser. No. 14/272,834, filed May 8, 2014; Ser. No. 14/356,330, filed May 5, 2014; Ser. No. 14/269,788, filed May 5, 2014; Ser. No. 14/268,169, filed May 2, 2014; Ser. No. 14/264,443, filed Apr. 29, 2014; Ser. No. 14/354,675, filed Apr. 28, 2014; Ser. No. 14/248,602, filed Apr. 9, 2014; Ser. No. 14/242,038, filed Apr. 1, 2014; Ser. No. 14/229,061, filed Mar. 28, 2014; Ser. No. 14/343,937, filed Mar. 10, 2014; Ser. No. 14/343,936, filed Mar. 10, 2014; Ser. No. 14/195,135, filed Mar. 3, 2014; Ser. No. 14/195,136, filed Mar. 3, 2014; Ser. No. 14/191,512, filed Feb. 27, 2014; Ser. No. 14/183,613, filed Feb. 19, 2014; Ser. No. 14/169,329, filed Jan. 31, 2014; Ser. No. 14/169,328, filed Jan. 31, 2014; Ser. No. 14/163,325, filed Jan. 24, 2014; Ser. No. 14/159,772, filed Jan. 21, 2014; Ser. No. 14/107,624, filed Dec. 16, 2013; Ser. No. 14/102,981, filed Dec. 11, 2013; Ser. No. 14/102,980, filed Dec. 11, 2013; Ser. No. 14/098,817, filed Dec. 6, 2013; Ser. No. 14/097,581, filed Dec. 5, 2013; Ser. No. 14/093,981, filed Dec. 2, 2013; Ser. No. 14/093,980, filed Dec. 2, 2013; Ser. No. 14/082,573, filed Nov. 18, 2013; Ser. No. 14/082,574, filed Nov. 18, 2013; Ser. No. 14/082,575, filed Nov. 18, 2013; Ser. No. 14/082,577, filed Nov. 18, 2013; Ser. No. 14/071,086, filed Nov. 4, 2013; Ser. No. 14/076,524, filed Nov. 11, 2013; Ser. No. 14/052,945, filed Oct. 14, 2013; Ser. No. 14/046,174, filed Oct. 4, 2013; Ser. No. 14/036,723, filed Sep. 25, 2013; Ser. No. 14/016,790, filed Sep. 3, 2013; Ser. No. 14/001,272, filed Aug. 23, 2013; Ser. No. 13/970,868, filed Aug. 20, 2013; Ser. No. 13/964,134, filed Aug. 12, 2013; Ser. No. 13/942,758, filed Jul. 16, 2013; Ser. No. 13/942,753, filed Jul. 16, 2013; Ser. No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/852,190, filed Mar. 28, 2013; Ser. No. 13/851,378, filed Mar. 27, 2013; Ser. No. 13/848,796, filed Mar. 22, 2012; Ser. No. 13/847,815, filed Mar. 20, 2013; Ser. No. 13/800,697, filed Mar. 13, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149 and/or U.S. Publication No. US-2006-0061008 and/or U.S. patent application Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A control system for a vehicle, said control system comprising:

a camera disposed at a vehicle equipped with said control system, said camera having a field of view exterior of the equipped vehicle;

an image processor operable to process image data captured by said camera;

wherein said image processor is operable to process captured image data to detect at least one of (i) an object in the field of view of said camera and (ii) another vehicle in the field of view of said camera;

wherein said control system is operable to determine a traffic condition that the equipped vehicle is traveling in and wherein, responsive to determination of the traffic condition, said control system is operable to control a steering system of the equipped vehicle;

wherein, responsive at least in part to image processing of captured image data by said image processor, said control system is operable to detect a lane splitting vehicle approaching or adjacent to the equipped vehicle;

wherein, with the equipped vehicle traveling in a traffic lane occupied by the equipped vehicle and responsive to detection, via image processing of captured image data by said image processor, of the lane splitting vehicle approaching or adjacent the equipped vehicle, said control system controls the steering system of the equipped vehicle to move the equipped vehicle in a direction away from a side region of the occupied traffic lane at which the lane splitting vehicle is detected while keeping the equipped vehicle in the occupied traffic lane;

wherein, after moving the equipped vehicle in the direction away from the side region of the occupied traffic lane at which the lane splitting vehicle is detected, and responsive to determination, via image processing by said image processor of captured image data, that the lane splitting vehicle has passed the equipped vehicle, said control system controls the steering system of the equipped vehicle to move the equipped vehicle back towards a center region of the occupied traffic lane;

wherein said control system, at least in part responsive to detection of a moving pedestrian in the path of travel of the equipped vehicle, reduces the forward speed of the equipped vehicle to allow the pedestrian time to move out of the path of travel of the moving equipped vehicle;

wherein said control system provides at least one of (i) lateral control based on a state space controller and (ii) longitudinal control based on a sliding mode controller; and wherein said control is operable to control the equipped vehicle based at least in part on a five element state vector comprising (i) a yaw rate vector, (ii) a slip angle vector, (iii) a front wheel steering angle vector, (iv) a heading angle vector of the angle between the equipped vehicle and (v) a target path and a lateral deviation vector of the deviation from the target path.

2. The control system of claim 1, wherein said control system, responsive at least in part to image processing of captured image data by said image processor, determines lane markings on the road on which the equipped vehicle is traveling and controls the steering system to move the equipped vehicle in the direction away from the side region of the occupied lane and at which the lane splitting vehicle is detected while keeping the equipped vehicle in the occupied traffic lane.

3. The control system of claim 1, wherein said camera is disposed at the equipped vehicle so as to have at least a sideward and rearward field of view.

4. The control system of claim 3, wherein, responsive at least in part to image processing of captured image data, said control system is operable to detect a lane splitting vehicle approaching the equipped vehicle from behind the equipped vehicle and is operable to control the steering system to move the equipped vehicle away from a path of travel of the detected rearward-approaching lane splitting vehicle.

5. The control system of claim 1, wherein said camera is part of a surround view vision system that includes cameras at respective front, rear and sides of the equipped vehicle and having respective exterior fields of view.

6. The control system of claim 1, wherein said control system is operable to determine a leading vehicle ahead of the equipped vehicle, and wherein said control system is operable to control the steering system of the equipped vehicle to follow the determined leading vehicle irrespective of determined lane markings on the road being traveled.

7. The control system of claim 1, wherein said control system, at least in part responsive to detection of a gap between a leading vehicle and a following vehicle in a lane adjacent to the occupied lane, is operable to control the steering system of the equipped vehicle to move the equipped vehicle towards and into the gap.

8. The control system of claim 7, wherein said control system is operable to steer the equipped vehicle towards and into the gap in a manner that allows the following vehicle to slow to allow the equipped vehicle to enter the gap.

9. The control system of claim 1, wherein said control system, at least in part responsive to detection of another vehicle indicating an intent to change lanes into the occupied lane and ahead of the equipped vehicle, is operable to control a braking system of the equipped vehicle to decelerate the equipped vehicle to allow for the lane change by the other vehicle.

10. The control system of claim 1, wherein said control system, at least in part responsive to detection of a stationary pedestrian in the path of travel of the equipped vehicle, is operable to stop the equipped vehicle.

11. The control system of claim 1, wherein said control system, at least in part responsive to detection of the moving pedestrian in the path of travel of the equipped vehicle, determines a predicted path of the moving pedestrian and maneuvers the slowly moving equipped vehicle to avoid collision with the moving pedestrian.

12. A control system for a vehicle, said control system comprising:

a camera disposed at a vehicle equipped with said control system, said camera having a field of view exterior of the equipped vehicle;

an image processor operable to process image data captured by said camera;

wherein said image processor is operable to process captured image data to detect at least one of (i) an object in the field of view of said camera and (ii) another vehicle in the field of view of said camera;

wherein said control system is operable to determine a traffic condition that the equipped vehicle is traveling in and wherein, responsive to determination of the traffic condition, said control system is operable to control a steering system of the equipped vehicle;

wherein, responsive at least in part to image processing of captured image data, said control system is operable to detect a lane splitting vehicle approaching or adjacent to the equipped vehicle;

wherein, with the equipped vehicle traveling in a traffic lane occupied by the equipped vehicle and responsive to detection of the lane splitting vehicle approaching or adjacent the equipped vehicle, said control system controls the steering system of the equipped vehicle to move the equipped vehicle in a direction away from a side region of the occupied lane at which the lane splitting vehicle is detected; and wherein said control is operable to control the equipped vehicle based at least in part on a five element state vector comprising (i) a yaw rate vector, (ii) a slip angle vector, (iii) a front wheel steering angle vector, (iv) a heading angle vector of the angle between the equipped vehicle and (v) a target path and a lateral deviation vector of the deviation from the target path.

13. A control system for a vehicle, said control system comprising:

a camera disposed at a vehicle equipped with said control system, said camera having a field of view exterior and at least partially sideward and rearward of the equipped vehicle;

wherein said camera is part of a surround view vision system that includes other cameras at the equipped vehicle having respective exterior fields of view;

an image processor operable to process image data captured by said camera;

wherein said image processor is operable to process captured image data to detect at least one of (i) an object in the field of view of said camera and (ii) another vehicle in the field of view of said camera;

wherein said control system is operable to determine a traffic condition that the equipped vehicle is traveling in and wherein, responsive to determination of the traffic condition, said control system is operable to control a steering system of the equipped vehicle;

wherein, responsive at least in part to image processing by said image processor of captured image data, said control system is operable to detect a lane splitting vehicle approaching or adjacent to the equipped vehicle;

wherein, with the equipped vehicle traveling in a traffic lane occupied by the equipped vehicle and responsive to detection, via image processing of captured image data by said image processor, of the lane splitting vehicle approaching the equipped vehicle from behind the equipped vehicle, said control system controls the steering system of the equipped vehicle to move the equipped vehicle in a direction away from a side region of the occupied traffic lane at which the lane splitting vehicle is detected and away from a path of travel of the detected rearward-approaching lane splitting vehicle;

wherein, after moving the equipped vehicle in the direction away from the side region of the occupied traffic lane at which the lane splitting vehicle is detected, and responsive to determination, via image processing by said image processor of captured image data, that the lane splitting vehicle has passed the equipped vehicle, said control system controls the steering system of the equipped vehicle to move the equipped vehicle back towards a center region of the occupied traffic lane;

wherein said control system is operable to determine a leading vehicle ahead of the equipped vehicle, and wherein said control system is operable to control the steering system of the equipped vehicle to follow the determined leading vehicle irrespective of determined lane markings on the road being traveled; and wherein said control is operable to control the equipped vehicle based at least in part on a five element state vector comprising (i) a yaw rate vector, (ii) a slip angle vector, (iii) a front wheel steering angle vector, (iv) a heading angle vector of the angle between the equipped vehicle and (v) a target path and a lateral deviation vector of the deviation from the target path.

14. The control system of claim 13, wherein said control system, responsive at least in part to image processing of captured image data, determines lane markings on the road on which the equipped vehicle is traveling and controls the steering system to move the equipped vehicle in the direction away from the side region of the occupied traffic lane and at which the lane splitting vehicle is detected while keeping the equipped vehicle in the occupied traffic lane.

15. The control system of claim 13, wherein said control system, at least in part responsive to detection of a stationary pedestrian in the path of travel of the equipped vehicle, is operable to stop the equipped vehicle, and wherein said control system, at least in part responsive to detection of a moving pedestrian in the path of travel of the equipped vehicle, is operable to reduce the forward speed of the equipped vehicle to allow the pedestrian time to move out of the path of travel of the equipped vehicle.

16. A control system for a vehicle, said control system comprising:

a plurality of cameras disposed at a vehicle equipped with said control system, said camera having respective fields of view exterior of the equipped vehicle;

an image processor operable to process image data captured by said cameras;

wherein said image processor is operable to process captured image data to detect at least one of (i) an object in the field of view of said camera and (ii) another vehicle in the field of view of said camera;

wherein said control system is operable to determine a traffic condition that the equipped vehicle is traveling in and wherein, responsive to determination of the traffic condition, said control system is operable to control a steering system of the equipped vehicle;

wherein, with the equipped vehicle traveling in a traffic lane occupied by the equipped vehicle, said control system is operable to process captured image data via said image processor to determine other vehicles in a traffic lane adjacent to the occupied traffic lane;

wherein, responsive to image processing by said image processor of captured image data, said control system detects a leading vehicle in the traffic lane adjacent to the occupied traffic lane and detects a following vehicle in the traffic lane adjacent to the occupied traffic lane and determines a gap between the detected leading vehicle and the detected following vehicle;

wherein said control system, at least in part responsive to determination of the gap between the detected leading vehicle and the detected following vehicle in the traffic lane adjacent to the occupied traffic lane, is operable to control the steering system of the equipped vehicle to move the equipped vehicle towards and into the gap;

wherein said control system is operable to steer the equipped vehicle towards and into the gap in a manner that allows the following vehicle to slow to allow the equipped vehicle to enter the gap;

wherein said control system, at least in part responsive to detection of another vehicle indicating an intent to change traffic lanes into the occupied traffic lane and ahead of the equipped vehicle, is operable to control a braking system of the equipped vehicle to decelerate the equipped vehicle to allow for the traffic lane change by the other vehicle;

wherein, responsive at least in part to image processing of captured image data, said control system is operable to detect a lane splitting vehicle approaching or adjacent to the equipped vehicle, and wherein, with the equipped vehicle traveling in the traffic lane occupied by the equipped vehicle and responsive to detection, via image processing of captured image data by said image processor, of the lane splitting vehicle approaching or adjacent the equipped vehicle, said control system controls the steering system of the equipped vehicle to move the equipped vehicle in a direction away from a side region of the occupied traffic lane at which the lane splitting vehicle is detected;

wherein, after moving the equipped vehicle in the direction away from the side region of the occupied traffic lane at which the lane splitting vehicle is detected, and responsive to determination, via image processing by said image processor of captured image data, that the lane splitting vehicle has passed the equipped vehicle, said control system controls the steering system of the equipped vehicle to move the equipped vehicle back towards a center region of the occupied traffic lane;

wherein said control system is operable to determine a leading vehicle ahead of the equipped vehicle in the traffic lane occupied by the equipped vehicle, and wherein said control system is operable to control the steering system of the equipped vehicle to follow the determined leading vehicle irrespective of determined lane markings on the road being traveled;

wherein said control system, at least in part responsive to detection of a moving pedestrian in the path of travel of the equipped vehicle, is operable to reduce the forward speed of the equipped vehicle to allow the pedestrian time to move out of the path of travel of the moving equipped vehicle; and wherein said control is operable to control the equipped vehicle based at least in part on a five element state vector comprising (i) a yaw rate vector, (ii) a slip angle vector, (iii) a front wheel steering angle vector, (iv) a heading angle vector of the angle between the equipped vehicle and (v) a target path and a lateral deviation vector of the deviation from the target path.

17. The control system of claim 16, wherein, responsive at least in part to image processing of captured image data, said control system is operable to detect a lane splitting vehicle rearward of and approaching the equipped vehicle, and wherein, with the equipped vehicle traveling in the traffic lane occupied by the equipped vehicle and responsive to detection of the lane splitting vehicle rearward of and approaching the equipped vehicle, said control system controls the steering system of the equipped vehicle to move the equipped vehicle in the direction away from a side region of the occupied traffic lane at which the lane splitting vehicle is detected.

18. The control system of claim 16, wherein, when following the determined leading vehicle outside of lane markings on the road being traveled, said control system controls the equipped vehicle at least in part responsive to a navigation system of the equipped vehicle.

19. The control system of claim 16, wherein said control system, at least in part responsive to detection of a stationary pedestrian in the path of travel of the equipped vehicle, is operable to stop the equipped vehicle.

20. The control system of claim 16, wherein said control system, at least in part responsive to detection of the moving pedestrian in the path of travel of the equipped vehicle, determines a predicted path of the moving pedestrian and maneuvers the slowly moving equipped vehicle to avoid collision with the moving pedestrian.

* * * * *

UNITED STATES PATENT AND TRADEMARK OFFICE
CERTIFICATE OF CORRECTION

PATENT NO. : 9,988,047 B2  
APPLICATION NO. : 14/568177  
DATED : June 5, 2018  
INVENTOR(S) : Nathaniel S. Johnson et al.

Page 1 of 1

It is certified that error appears in the above-identified patent and that said Letters Patent is hereby corrected as shown below:

In the Specification

Column 4

Lines 1-3, the formula "$t_k = 1 \text{ s}, v_{ego} = 10 \frac{m}{s}$." should be --$t_h = 1 \text{ s}, v_{ego} = 10 \frac{m}{s}$--

Column 13

Line 27, the formula "$y_{tgt} = y_{lane} + r_{lane} \cdot x_{tgt} + \frac{1}{2} \cdot K_{lane} \cdot x_{tgt}^2$" should be --$y_{tgt} = y_{lane} + r_{lane} \cdot x_{tgt} + \frac{1}{2} \cdot K_{lane} \cdot x_{tgt}^2$--

Lines 28-38, "where $y_{tgt}$ is the lateral position of the lane marking at the longitudinal position $$x_{tgt} v_{tgt} \leq \frac{x_{stop,max}}{v_{tgt}}$$

of the target, $y_{lane}$ is the relative heading angle between SV and the lane and $K_{lane}$ is the curvature of the lane. The input values describing the lane and objects are provided by the camera sensor and then recalculated by Path Planning." should be  
--where $y_{tgt}$ is the lateral position of the lane marking at the longitudinal position $x_{tgt}$ of the target, $r_{lane}$ is the relative heading angle between SV and the lane and $K_{lane}$ is the curvature of the lane. The input values describing the lane and objects are provided by the camera sensor and then recalculated by Path Planning.--

Line 53, "headway $t_h, x = [\psi, \beta, \delta, r, dy]^T \dot{\psi},$" should be --headway $t_h$,--

Column 14

Lines 10-14, the formula "$v_{tgt} \leq \frac{x_{stop,max}}{t_k}$" should be --$v_{tgt} \leq \frac{x_{stop,max}}{t_h}$--

Signed and Sealed this  
Sixth Day of November, 2018

Andrei Iancu  
*Director of the United States Patent and Trademark Office*